(12) United States Patent
Rosenberg et al.

(10) Patent No.: US 10,088,947 B2
(45) Date of Patent: Oct. 2, 2018

(54) SYSTEM AND METHOD FOR DETECTING AND CHARACTERIZING FORCE INPUTS ON A SURFACE

(71) Applicant: Sensel Inc., Mountain View, CA (US)

(72) Inventors: Ilya Daniel Rosenberg, Mountain View, CA (US); John Aaron Zarraga, Mountain View, CA (US); Charles Watson, Mountain View, CA (US)

(73) Assignee: Sensel Inc., Mountain View, CA (US)

( * ) Notice: Subject to any disclaimer, the term of this patent is extended or adjusted under 35 U.S.C. 154(b) by 0 days.

(21) Appl. No.: 15/470,669

(22) Filed: Mar. 27, 2017

(65) Prior Publication Data

US 2017/0300166 A1    Oct. 19, 2017

Related U.S. Application Data

(60) Provisional application No. 62/313,536, filed on Mar. 25, 2016.

(51) Int. Cl.
| | |
|---|---|
| *G06F 3/041* | (2006.01) |
| *G06F 3/044* | (2006.01) |
| *G06F 3/045* | (2006.01) |
| G06F 3/0354 | (2013.01) |

(52) U.S. Cl.
CPC ............ *G06F 3/0416* (2013.01); *G06F 3/041* (2013.01); *G06F 3/044* (2013.01); *G06F 3/045* (2013.01); *G06F 3/0414* (2013.01); *G06F 3/03545* (2013.01); *G06F 3/03547* (2013.01); *G06F 2203/04106* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 2009/0194341 A1* | 8/2009 | Nousiainen | G06F 1/3203 178/18.01 |
| 2011/0267300 A1* | 11/2011 | Serban | G06F 3/03547 345/174 |
| 2012/0074961 A1 | 3/2012 | Herrmann | |
| 2012/0218210 A1* | 8/2012 | DeCaro | G06F 3/044 345/173 |

(Continued)

*Primary Examiner* — Ryan A Lubit
(74) *Attorney, Agent, or Firm* — Run8 Patent Group, LLC; Peter Miller

(57) ABSTRACT

One variation of a method for detecting and characterizing force inputs on a surface includes: during a resistance scan cycle of a sampling period, driving a shield electrode arranged over a resistive touch sensor to a reference potential and reading resistance values across sense electrode and drive electrode pairs in the resistive touch sensor; during a processing cycle of the sampling period, transforming the resistance values into a position and a magnitude of a force applied to a tactile surface over the shield electrode, releasing the shield electrode from the reference potential, reading a capacitance value of the shield electrode, and detecting proximity of an object to the tactile surface based on the capacitance value; and generating a touch image representing the position and the magnitude of the force on the tactile surface based on the proximity of the object to the tactile surface.

20 Claims, 9 Drawing Sheets

(56) References Cited

U.S. PATENT DOCUMENTS

| | | | |
|---|---|---|---|
| 2012/0306802 A1* | 12/2012 | McCracken | G06F 3/0416 |
| | | | 345/174 |
| 2013/0033450 A1 | 2/2013 | Coulson et al. | |
| 2013/0285970 A1 | 10/2013 | Ahn et al. | |
| 2014/0042398 A1* | 2/2014 | Choi | H01L 27/3244 |
| | | | 257/40 |
| 2014/0062934 A1 | 3/2014 | Coulson et al. | |
| 2014/0293144 A1* | 10/2014 | Bae | G06F 3/041 |
| | | | 349/12 |
| 2015/0160754 A1 | 6/2015 | Wenzel | |
| 2016/0162093 A1* | 6/2016 | Kim | G06F 3/0412 |
| | | | 345/174 |
| 2017/0235414 A1* | 8/2017 | Ding | G06F 3/0416 |
| | | | 345/174 |
| 2017/0262099 A1* | 9/2017 | Nathan | G06F 3/044 |

\* cited by examiner

SYSTEM AND METHOD FOR DETECTING AND CHARACTERIZING FORCE INPUTS ON A SURFACE

CROSS-REFERENCE TO RELATED APPLICATIONS

This application claims the benefit of U.S. Provisional Application No. 62/313,536, filed on 25 Mar. 2016, which is incorporated in its entirety by this reference.

This application is related to U.S. patent application Ser. No. 14/499,001, filed on 26 Sep. 2014, which is incorporated in its entirety by this reference.

TECHNICAL FIELD

This invention relates generally to the field of touch sensors and more specifically to a new and useful system and method of detecting and characterizing force inputs on a surface in the field of touch sensors.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System and Method

Figure 1:
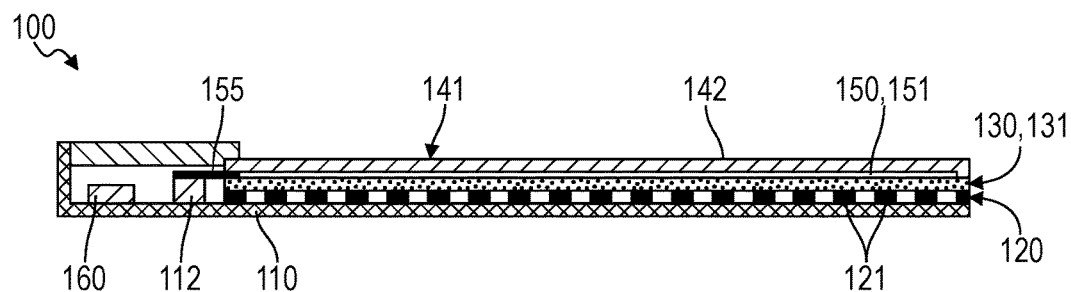
FIG. 1 is a schematic representation of a system.
Figure 2:
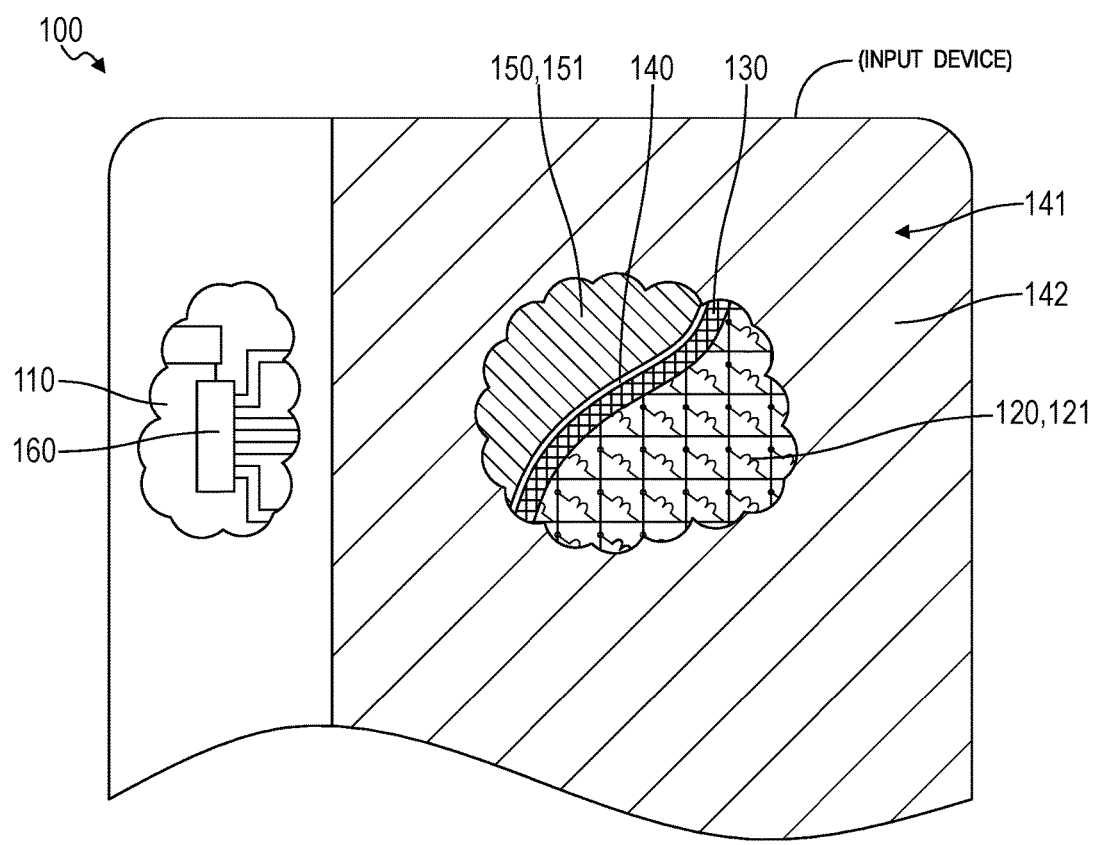
FIG. 2 is a schematic representation of one variation of the system.

As shown in FIGS. 1 and 2, a system 100 for detecting and characterizing force inputs on a surface includes: a substrate 110; a resistive touch sensor 120 arranged across the substrate 110 and comprising an array of sense electrode and drive electrode pairs 121; a force-sensing layer 130 arranged over the resistive touch sensor 120 opposite the substrate 110 and comprising a force-sensitive material 131 exhibiting variations in local bulk resistance responsive to local variations in applied force; a first shield electrode 151 coupled to the force-sensing layer 130, extending across a first region of the force-sensing layer 130, and electrically coupled to the substrate 110; and a controller 160 coupled to the substrate 110. The controller 160 is configured to: drive the first shield electrode 151 to a virtual reference potential and to read resistance values across sense electrode and drive electrode pairs 121 in the resistive touch sensor 120 during a first resistance scan cycle in a first sampling period; and to release the first shield electrode 151 from the virtual reference potential and to transform resistance values read from sense electrode and drive electrode pairs 121 in the force-sensing layer 130 into a force touch image during a first processing cycle succeeding the first resistance scan cycle within the first sampling period, wherein the force touch image represents locations and force magnitudes of objects applied over the force-sensing layer 130.

As shown in FIGS. 3A, 3B, 3C, and 4, the system 100 can execute a method S100 including: during a first period, holding a shield electrode arranged over a resistive touch sensor 120 to a virtual reference potential in Block S110 and reading resistance values across sense electrode and drive electrode pairs 121 in the resistive touch sensor 120 in Block S112; during a second time period succeeding the first time period, transforming resistance values read from sense electrode and drive electrode pairs 121 in the resistive touch sensor 120 during the first time period into position and a magnitude of a force applied to a surface over the shield electrode 151 in Block S120, reading a capacitance value from the shield electrode 151 in Block S122, and correlating the capacitance value with proximity of a mass to the surface in Block S124; and generating a touch image defining the position of the force on the surface, the magnitude of the force on the surface, the proximity of the mass to the surface, and a position of the shield electrode 151 for a sampling period comprising the first time period and the second time period in Block S140.

Figure 3A:
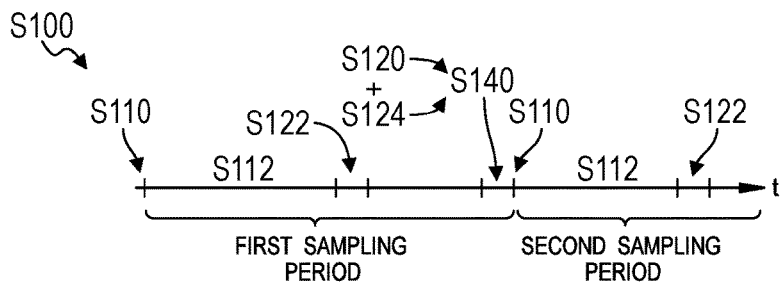
FIGS. 3A, 3B, and 3C are a flowchart representations of variations of a method.

As shown in FIG. 3A, one variation of the method S100 includes, during a first resistance scan cycle of a first sampling period: driving a first shield electrode 151 arranged over a resistive touch sensor 120 to a virtual reference potential in Block S110; and reading a first set of resistance values across sense electrode and drive electrode pairs 121 in the resistive touch sensor 120 in Block S112. In this variation, the method S100 also includes, during a first processing cycle succeeding the first resistance scan cycle of the first sampling period: transforming the first set of resistance values into a first position and a first magnitude of a first force applied to a surface over the shield electrode 151 in Block S120; releasing the first shield electrode 151 from the virtual reference potential in Block S122; reading a first capacitance value of the first shield electrode 151 in Block S122; and detecting proximity of a first object to the surface based on the first capacitance value in Block S124. Furthermore, in this variation, the method S100 includes: generating a first touch image representing the first position and the first magnitude of the first force on the surface for the first sampling period based on the proximity of the first object to the surface in Block S140.

Figure 3B:
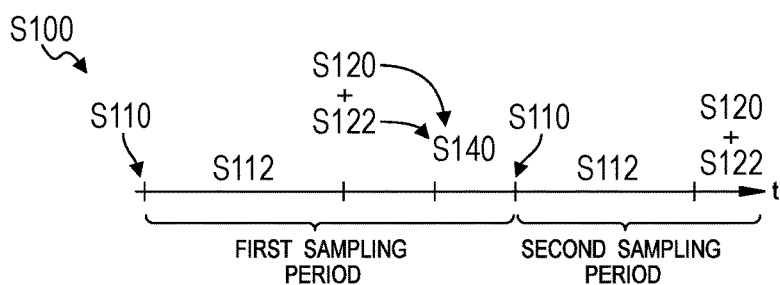
Figure 3C:
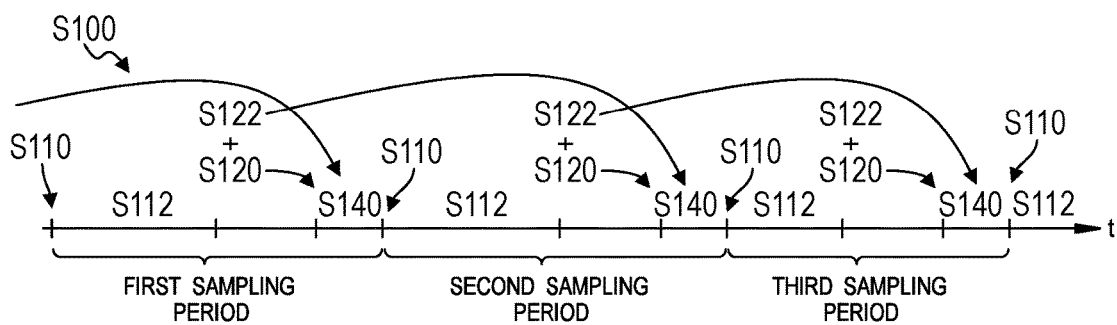

As shown in FIG. 3C, another variation of the method S100 includes, during a first resistance scan cycle of a first sampling period: driving a first shield electrode 151 arranged over a resistive touch sensor 120 to a virtual reference potential in Block S110; and reading a first set of resistance values across sense electrode and drive electrode pairs 121 in the resistive touch sensor 120 in Block S112. In this variation, the method S100 also includes, during a first processing cycle succeeding the first resistance scan cycle of the first sampling period: transforming the first set of resistance values into a first position and a first magnitude of a force applied to a surface over the shield electrode 151 in Block S120; releasing the first shield electrode 151 from the virtual reference potential in Block S122; reading a first capacitance value of the first shield electrode 151 in Block S122; and detecting a second proximity of an object to the surface based on the first capacitance value in Block S124. Furthermore, in this variation, the method S100 includes, during a second resistance scan cycle of a second sampling period: driving the first shield electrode 151 to the virtual reference potential in Block S110; and reading a second set of resistance values across sense electrode and drive electrode pairs 121 in the resistive touch sensor 120 in Block S112. Finally, this variation of the method S100 includes, during a second processing cycle succeeding the second resistance scan cycle of the second sampling period: transforming the second set of resistance values into a second position and a second magnitude of the force applied to the surface in Block S120; and generating a second touch image representing the second position and the second magnitude of the force on the surface for the second sampling period based on the first proximity of the object to the surface in Block S140.

2. Applications

The system 100 includes: a resistive touch sensor 120; a pressure-sensitive force-sensing layer 130 over the resistive touch sensor 120; a controller 160 that reads resistance values (or voltages, current draws) across drive and sense electrodes within the resistive touch sensor 120 and correlates these resistance values with magnitudes of touch inputs over the force-sensing layer 130; and a shield electrode arranged over the force-sensing layer 130 and intermittently driven to a virtual reference potential by the controller 160 to shield the resistive touch sensor 120 from external electric fields. Generally, the system can include: a resistive touch sensor 120 and a force-sensing layer 130 that cooperate to detect locations, contact areas, and force magnitudes (or "pressures") of inputs across a cover layer 141; and a shield electrode that functions to reject or reduce injection of noise into the resistive touch sensor 120. For example, the system 100 can be integrated into a laptop computer, mobile computing device (e.g., smartphone, tablet), peripheral keyboard, or peripheral trackpad device. In this example, a battery charger, power supply, wireless radio, and/or display connected to or integrated into the device may radiate or emit noise that interferes with resistance data collected by the resistive touch sensor 120.

Therefore, the system 100 can include a set of (i.e., one or more) shield electrodes spanning the resistive touch sensor 120, and the controller 160 can actively drive the shield electrode(s) 150 to a virtual reference potential (e.g., "ground") during a resistance scan cycle of a sampling period in order to reject or reduce energy radiated from these other components toward the resistive touch sensor 120, which may otherwise create noise in resistance data collected from the resistive touch sensor 120 during operation. In particular, during operation of a device incorporating the system 100, the controller 160 can: drive the shield electrode 151 to a virtual reference potential in Block S110 and record resistance values across drive and sense electrodes within the resistive touch sensor 120 in Block S112 during a resistance scan cycle; transform these resistance values into positions, areas, magnitudes of forces, and/or pressures of one or more inputs applied to the cover layer 141 over the resistive touch sensor 120 in Block S120 during a subsequent processing cycle; output a "touch image" representing these inputs during this sampling period in Block S140; and repeat this process for each subsequent sampling period during operation of the device.

During a processing cycle in which the controller 160 transforms resistance data into locations and magnitudes of forces applied to the cover layer 141 and in which the resistive touch sensor 120 is inactive, the controller 160 can also implement surface or projected capacitance sensing techniques to: charge and discharge the set of shield electrodes 150; record capacitance values (current leakage, charge time, discharge time, or total charge/discharge time) across the set of shield electrodes 150 in Block S122; and detect the presence of one or more external masses proximal—though not necessarily in contact with—the cover layer 141 in Block S124 based on capacitance values recorded during this processing cycle. For example, the resistive touch sensor 120 can include a number of resistive sensor locations—each defined by a junction between a drive electrode and sense electrode—that (greatly) exceeds a number of capacitive sensor locations defined by the set of shield electrodes 150; therefore while processing a relatively large set of (e.g., thousands) resistance values during a processing cycle of a sampling period, the controller 160 can also read a relatively small number of (e.g., one, thirty-two) capacitance values from the set of shield electrodes 150 and transform these capacitance values into an estimate of locations, sizes, and/or types of multiple discrete objects hovering over or in contact with the cover layer 141 during the same sampling period.

Therefore, the controller 160 can drive one shield electrode to a virtual ground potential (e.g., a virtual ground potential, or "oV") during a resistance scan cycle within a sampling period in order to reject or reduce noise in resistance data collected from the resistive touch sensor 120 during this sampling period. While these resistance data are processed during the subsequent processing cycle—and before a next resistance scan cycle in a subsequent sampling period—the controller 160 can release the shield electrode 151 from the virtual reference potential and instead sample a capacitance value from the shield electrode. The controller 160 can then: select an input scheme for characterizing one or more discrete force inputs detected on the cover layer 141 by the resistive touch sensor 120 during the sampling period; group clusters of discrete force inputs detected at the resistive touch sensor 120; and/or discard select force inputs detected at the resistive touch sensor 120 (e.g., palm resting on the system 100 but not the tip of a stylus); etc. based on this capacitance value—recorded substantially immediately after the resistance scan cycle—and substantially without sacrificing a sampling rate of the resistive touch sensor 120 or the effectiveness of the shield electrode 151 as an active electrostatic shield (or guard) while the resistive touch sensor 120 is scanned. The controller 160 can also: adjust its sensitivity to transforming resistance values into forces on the cover layer 141; adjust the scan resolution of the resistance touch sensor; and/or selectively activate and deactivate the resistive touch sensor 120 in a subsequent resistance scan cycle based on this capacitance value.

The system 100 can also include multiple shield electrodes arranged over the resistive touch sensor 120. The controller 160 can collectively tie the shield electrodes to a virtual reference potential while scanning the resistive touch sensor 120 and then scan the shield electrodes in series (e.g., in a "capacitance scan period") while resistance data is processed in order to collect higher-resolution data regarding the position and/or size of an external mass over—but not necessarily in contact with—the system 100.

The shield electrode(s) 150 is described herein in a common shield configuration in which the shield electrode 151 is driven to a virtual reference potential (e.g., to a LO voltage terminal within the system 100) during resistance scan cycles. However, the shield electrode(s) 150 can alternatively be implemented in a driven guard configuration in which the shield electrode 151 is buffered or driven to a measurement circuit voltage (e.g., to instrument HI voltage terminal within the system 100) during resistance scan cycles.

Furthermore, the system 100 can be integrated into a laptop computer, a mobile computing device (e.g., a tablet, a smartphone, a smartwatch), a peripheral keyboard, a peripheral trackpad, a gaming controller 160, or any other electronic or computing device to detect inputs entered by a user. For example, the substrate 110, the resistive touch sensor 120, and the force-sensing layer 130 can cooperate to define an opaque touchpad integrated into a C-side of a laptop computer (i.e., a face of the laptop computer facing a display when the laptop computer is closed and arranged below the display when the laptop computer is open). In another example, the system 100 can be arranged under a display to form a pressure-sensitive touchscreen, and the pressure-sensitive touchscreen can be integrated into a tablet, smartphone, or smartwatch. However, the system 100 can define any other form or format and can be integrated into any other device to detect adjacent objects, to record locations and magnitudes of forces applied thereover, and to package these data into touch images throughout operation of the device; the device can then control its functions based on these touch images.

3. Resistive Touch Sensor And Force-Sensing Layer

As shown in FIGS. 1 and 2, the touch sensor includes: an array of sense electrode and drive electrode pairs 121 patterned across a substrate 110 (e.g., a fiberglass PCB); and a force-sensing layer 130 arranged over the substrate 110 in contact with the drive and sense electrode pairs (or "sensor elements"), defining a force-sensitive material 131 exhibiting variations in local bulk resistance and/or local contact resistance responsive to variations in force applied to the cover layer 141 above. As described in U.S. patent application Ser. No. 14/499,001, the resistive touch sensor 120 can include a grid of inter-digitated drive electrodes and sense electrodes patterned across the substrate 110. The force-sensing layer 130 can span gaps between each drive and sense electrode pair across the substrate 110 such that, when a localized force is applied to the cover layer 141, the resistance across an adjacent drive and sense electrode pair varies proportionally (e.g., linearly, inversely, quadratically, or otherwise) with the magnitude of the applied force. As described below, the controller 160 can read resistance values across each drive and sense electrode pair within the touch sensor and can transform these resistance values into a position and magnitude of one or more discrete force inputs applied to the cover layer 141.

In one implementation, the system includes a rigid substrate 110, such as in the form of a rigid PCB (e.g., a fiberglass PCB) or a PCB on a rigid backing (e.g., an aluminum backing plate); and rows and columns of drive and sense electrodes are patterned across the top of the substrate 110 to form an array of sensor elements. The force-sensing layer 130 is installed over the array of sensor elements and connected to the substrate 110 about its perimeter.

4. Controller

Generally, the controller 160 functions to drive the resistive touch sensor 120, to read resistance values between drive and sense electrodes, to tie the shield electrode 151 to a virtual reference potential during resistance scan cycles, and to transform resistance data from the resistive touch sensor 120 into locations and magnitudes of force input over the resistive touch sensor 120. (Alternatively, the controller 160 can drive the shield electrode 151 to any other known voltage potential relative to a virtual reference potential.)

In one implementation, the controller 160 includes: an array column driver (ACD); a column switching register (CSR); a column driving source (CDS); an array row sensor (ARS); a row switching register (RSR); and an analog to digital converter (ADC); as described in U.S. patent application Ser. No. 14/499,001. In this implementation, the resistive touch sensor 120 can include a variable impedance array (VIA) that defines: interlinked impedance columns (IIC) coupled to the ACD; and interlinked impedance rows (IIR) coupled to the ARS. During a resistance scan cycle: the ACD can select the IIC through the CSR and electrically drive the IIC with the CDS; the VIA can convey current from the driven IIC to the IIC sensed by the ARS; the ARS can select the IIR within the resistive touch sensor 120 and electrically sense the IIR state through the RSR; and the controller 160 can interpolate sensed current/voltage signals from the ARS to achieve substantially accurate detection of proximity, contact, pressure, and/or spatial location of a discrete force input over the resistive touch sensor 120 for the resistance scan cycle during a processing cycle within the same sampling period.

For example, a row of drive electrodes in the resistance touch sensor can be connected in series, and a row of sense electrodes in the resistive touch sensor 120 can be similarly connected in series. While driving the shield electrode(s) 150 to the virtual reference potential during a resistance scan cycle of a sampling period, the controller 160 can: drive a first row of drive electrodes to a reference voltage while floating all other rows of drive electrodes; record a voltage of a first column of sense electrodes while floating all other columns of sense electrodes; record a voltage of a second column of sense electrodes while floating all other columns of sense electrodes; . . . record a voltage of a last column of sense electrodes while floating all other columns of sense electrodes; drive a second row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; . . . record a voltage of the last column of sense electrodes while floating all other columns of sense electrodes; . . . and finally drive a last row of drive electrodes to the reference voltage while floating all other rows of drive electrodes; record a voltage of the first column of sense electrodes while floating all other columns of sense electrodes; record a voltage of the second column of sense electrodes while floating all other columns of sense electrodes; . . . record a voltage of the last column of sense electrodes while floating all other columns of sense electrodes. The controller 160 can thus sequentially drive rows of drive electrodes in the resistive touch sensor 120; and sequentially read resistance values (e.g., voltages) from rows of sense electrodes in the resistive touch sensor 120.

The controller 160 can also drive the shield electrode 151 and sample a capacitance value from the shield electrode during a capacitance scan period, such as preceding, succeeding, or concurrent with a processing cycle for resistance data. For example, the controller 160 can include a single- or multi-channel capacitive touch sensor driver electrically coupled to the shield electrode(s) 150, configured to drive the shield electrode(s) 150 to a target voltage and to track a charge time, a discharge time, and/or a total charge/discharge time of the shield electrode(s) 150 during a processing cycle of a sampling period and to drive the shield electrode(s) 150 to the virtual reference potential during a resistance scan cycle.

The controller 160 can therefore: scan thousands of drive and sense electrode pairs (or "sensor elements") during a resistance scan period; scan a single or relatively small number of shield electrodes (e.g., thirty-two or fewer shield electrodes) while these resistance data are processed during a processing cycle; and then merge the resistance and capacitance data into a single touch image for the sampling period (or into a pair of aligned force and capacitance touch images).

5. Shield Electrode

The shield electrode 151 is arranged over the force-sensing material and is electrically coupled to the substrate 110. Generally, the shield electrode 151 functions as an electrostatic shield (or an electromagnetic guard) for the resistive touch sensor 120 when driven to a virtual reference potential (or when driven to an instrument HI voltage).

In one implementation: the substrate 110 defines a rigid planar structure (e.g., a fiberglass PCB); the resistive touch sensor 120 includes an array of drive and sense electrodes (e.g., multiple rows of drive electrodes and multiple columns of sense electrodes) patterned across the substrate 110 as shown in FIG. 2; the force-sensing layer 130 is arranged over the resistive touch sensor 120 and is fixed to the resistive touch sensor 120 (or directly to the substrate no) around its perimeter; a non-conductive buffer layer 140 (e.g., a film of a non-conductive material such as PET, polyimide, or silicone) is applied across the force-sensing layer 130 opposite the resistive touch sensor 120; the shield electrode 151 is applied or formed across the buffer layer 140; and a non-conductive cover layer 142 (e.g., a second film of a non-conductive material) is applied over the shield electrode 151 and the force-sensing layer 130 to enclose the "stack" and to define an outer cover layer 141. In this implementation, the controller 160 can be installed directly onto the substrate 110, such as along one or more sides of the resistive touch sensor 120, to form a fully-contained system defining a pressure-sensitive surface and configured to output a touch image representing positions and magnitudes of forces applied to the cover layer 141.

Figure 4:
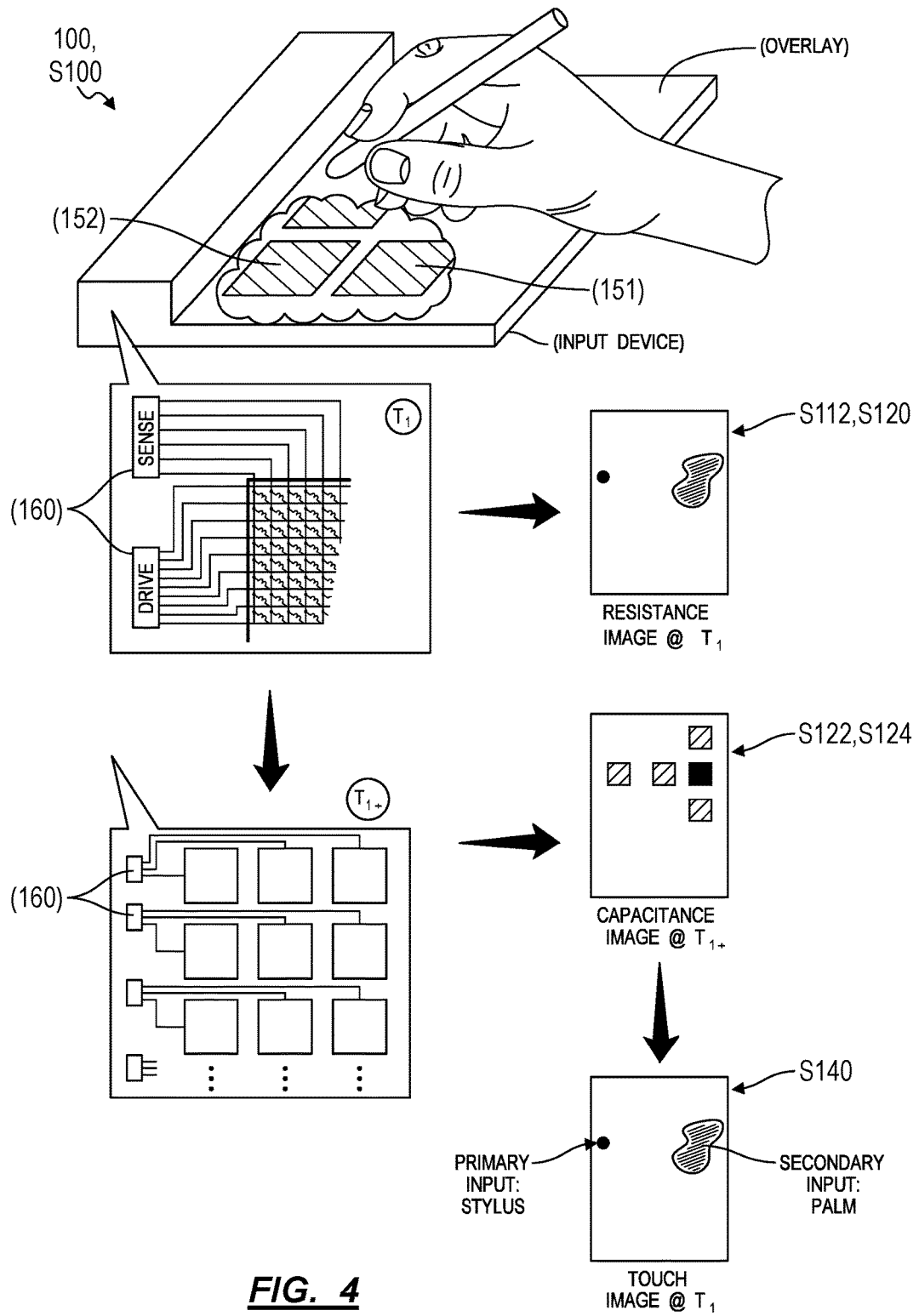
FIG. 4 is a flowchart representation of one variation of the system and method.

In the foregoing implementation, a tactile overlay—such as a QWERTY keyboard overlay, a piano key overlay, a MIDI overlay, or a color palette overlay—can be transiently installed or placed over the cover layer 141 to provide tactile positional guidance to a user interfacing with the system 100 to enter inputs into a connected or integrated computing device, a shown in FIG. 4.

In the foregoing implementation, to enable the force-sensing layer 130 to deform—and to therefore exhibit a change in its bulk resistance proximal a deformation—the buffer layer 140 and cover layer 142 can be similarly elastic. For example, the buffer and cover layers can each include a thin silicone, polyurethane, or polycarbonate film. The shield electrode 151 can also be substantially elastic. For example, the shield electrode 151 can include a copper, silver, or aluminum foil or film bonded to and interposed between the buffer and cover layers. In another example, the shield electrode 151 can include a metal (e.g., copper, silver, or aluminum) film deposited onto the buffer layer 140, such as through chemical vapor deposition or sputtering. In a similar example, the shield electrode 151 can include a metallized ink deposited (or "printed") onto the buffer layer 140 or onto the interior surface of the cover layer 142 before the cover layer 142 is bonded over the buffer layer 140.

Figure 5A:
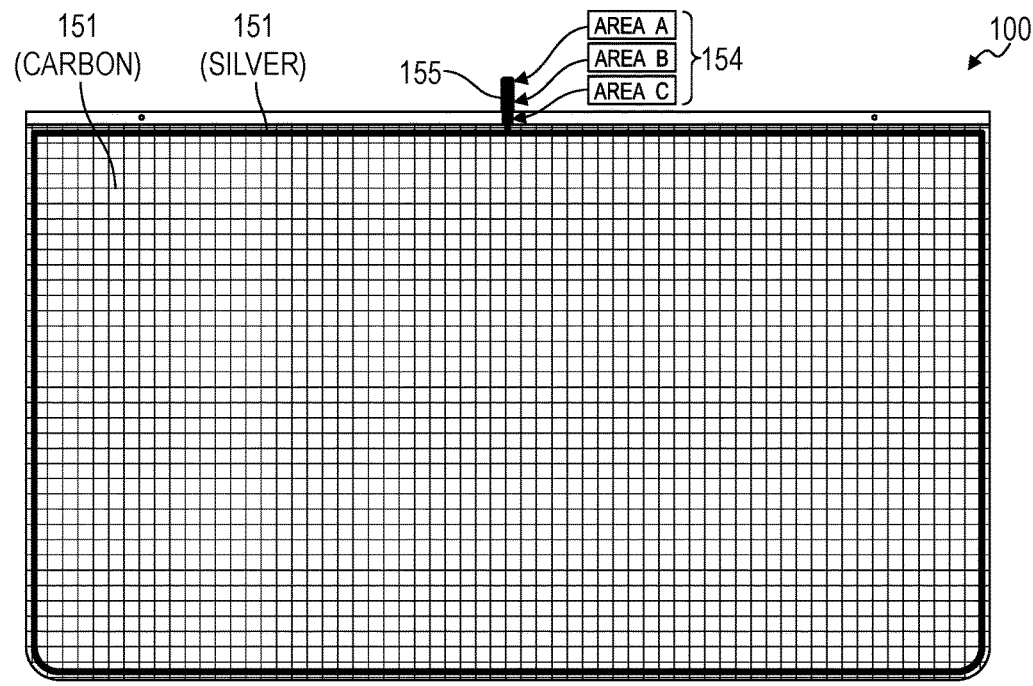
FIGS. 5A and 5B are schematic representations of variations of the system.
Figure 9A:
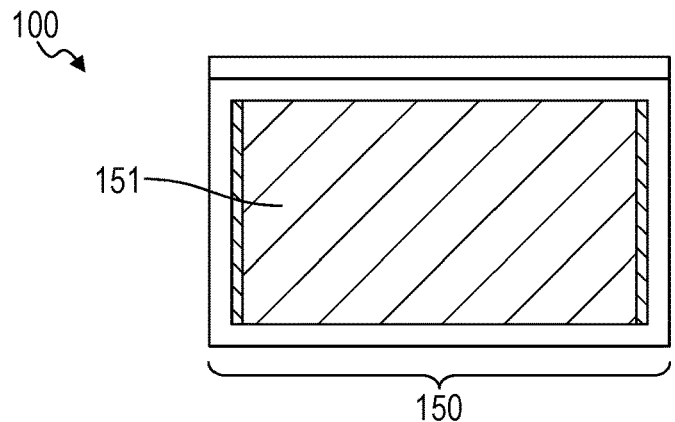
FIGS. 9A, 9B, 9C, and 9D are schematic representations of variations of the system.

In yet another example, the shield electrode 151 includes: a conductive carbon film (e.g., carbon nanotubes) deposited across the buffer layer 140; and an intermediate metallic (e.g., copper, silver) electrode—in film, foil, paste, ink or other form—extending along one or more sides of the conductive carbon film, as shown in FIGS. 5A and 9A. In this example, the shield electrode 151 can include: a conductive carbon film defining a rectangular perimeter; and an intermediate metallic electrode extending along both short edges of the carbon nanotube film, electrically coupled to the controller 160, and cooperating with the opposing intermediate metallic electrode to induce a substantially uniform electric field across the carbon nanotube film. Similarly, the shield electrode 151 can include: a conductive metallic film defining a perimeter of the first shield electrode 151; and a conductive carbon film spanning a region of the force-sensing layer 130 bounded by the conductive metallic film. In other examples, the shield electrode 151 can include a conductive ink, a conductive polymer, a graphite sheet, or other conductive material deposited onto, printed on, and/or interposed between the buffer layer 140 and/or the cover layer 142.

Figure 6A:
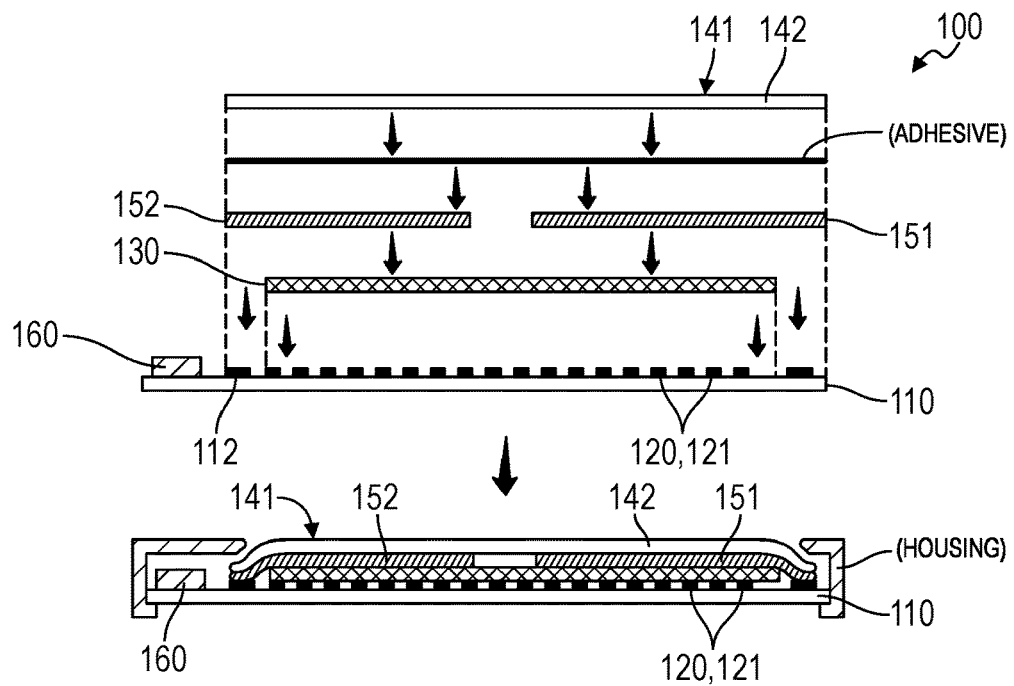
FIGS. 6A and 6B are schematic representations of variations of the system.

In another implementation shown in FIG. 6A, the shield electrode 151 is installed, applied, or formed directly onto the force-sensitive material 131 opposite the resistive touch sensor 120; and an elastic buffer layer 140 is bonded over the shield electrode 151 and force-sensitive material 131 to define the cover layer 141 and to complete the force-sensing layer 130. However, the shield electrode 151 can be of any other material and incorporated between the buffer layer 140 and the cover layer 142 in any other way.

Figure 6B:
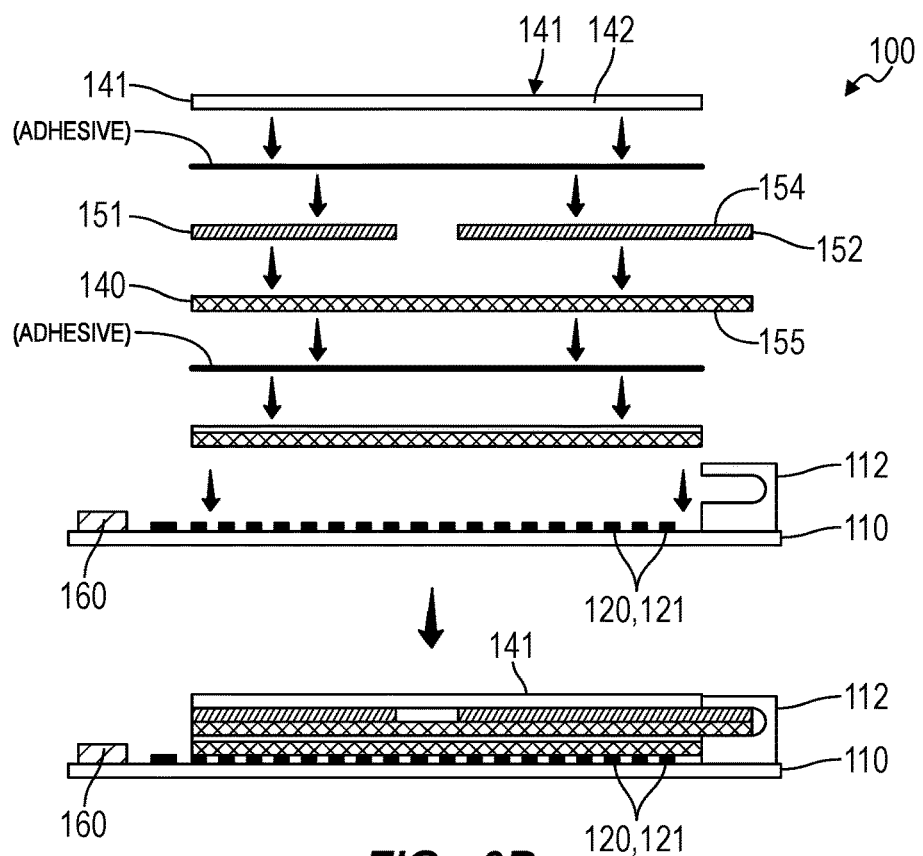

The shield electrode 151 can define a continuous structure (e.g., a film, sheet, or layer, etc.) over the force-sensitive material 131 of the force-sensing layer 130, as shown in FIG. 2. Alternatively, the shield electrode 151 can define a perforated structure, as shown in FIG. 6B. For example, the shield electrode 151 can define a grid array of square or round openings of maximum width (significantly) less than a smallest target wavelength of electromagnetic radiation output by circuitry within the system 100 and/or by electrical components in other devices commonly in use near the system 100. In another example, the system 100 can include a grid array of multiple smaller, offset shield electrodes spanning the width and length of the force-sensing layer 130 but covering less than (e.g., 50% of) the full area of the force-sensing layer 130.

Figure 5B:
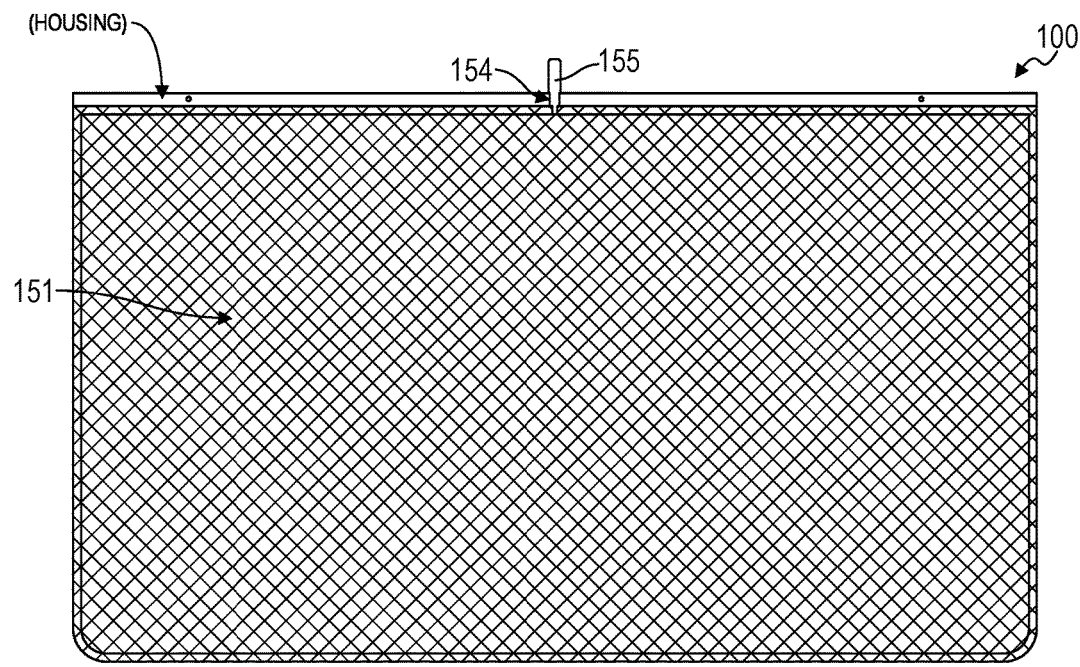

The shield electrode 151 is electrically coupled to the controller 160 via the substrate 110. In one implementation shown in FIG. 5A, 5B, and 6B, the force-sensing layer 130 includes a tab 155, such as in the form of a flexible PCB, extending from the perimeter of the buffer layer 140 and configured to contact a terminal on the substrate 110; and the shield electrode 151 includes a trace 154(e.g., a metalized foil) that extends from the shield electrode 151 to the end of the tab 155. For example, the substrate 110 can include a receptacle 112 electrically coupled to the controller 160, and the tab 155 can be inserted into the receptacle 112 when the system 100 is assembled, as shown in FIG. 1, to electrically couple the shield electrode 151 to the controller 160. Similarly, the buffer layer 140 can include an elastic tab 155 extending beyond the perimeter of the force-sensing material and configured to engage the receptacle 112 on the substrate 110; and the shield electrode 151 can include an electrical trace 154 extending along the elastic tab 155 and configured to mate with an electrical connector within the receptor to electrically couple the shield electrode 151 to the controller 160. Furthermore, in the variation described below in which the system 100 includes multiple shield electrodes, the tab 155 can include a row of traces, each trace 154 coupled to one shield electrode, to one row of shield electrodes, or to one column of shield electrodes, as shown in FIG. 5A; a multi-channel receptacle 112—electrically coupled to the controller 160—can thus be arranged on the substrate 110 and configured to receive the tab 155, as described above, thereby connecting each shield electrode to the controller 160.

In another implementation shown in FIG. 6A: the substrate 110 includes an electrical pad arranged near a perimeter of the force-sensing layer 130 and electrically coupled to a port on the controller 160 via a conductive trace; the buffer layer 140 extends beyond the perimeter of the force-sensing material; and the shield electrode 151 extends across the interior face of the buffer layer 140 and includes an electrical trace 154 extending to a perimeter of the buffer layer 140. In this implementation, the buffer layer 140 can be mechanically fastened (e.g., clamped) or adhered (e.g., bonded) to the substrate 110 with the electrical trace 154 aligned with and facing the electrical pad on the substrate no. The electrical trace 154 extending from the shield electrode 151 along the back surface of the buffer layer 140 can thus mate with the electrical pad on the substrate 110 to electrically couple the shield electrode 151 to the controller 160. For example, the interior surface of the buffer layer 140 can be activated to bond to a conductive (e.g., silver and/or carbon nanotube) material, and the conductive material can be printed, deposited, or otherwise applied across the interior surface of the buffer layer 140 to form one or more shield electrodes and one or more electrical traces extending from each shield electrode to proximal the perimeter of the buffer layer 140. The electrical traces can then be masked, an adhesive applied across the shield electrodes and exposed areas of the interior surface of the buffer layer 140, and the force-sensing material can then be bonded to the adhesive to complete the force-sensing layer 130/shield electrode assembly. The assembly can then be installed directly over the substrate no to electrically couple the shield electrodes to the controller 160 via traces on the back surface of the buffer layer 140 and corresponding conductive pads on the substrate 110.

5.1 Display

In one variation, the system 100 further includes a display arranged over the force-sensing layer 130 opposite the substrate 110; and the shield electrode 151 is integrated into the display. For example, the display can include an RGB LCD display with a glass or polymer exterior surface that defines the cover layer 141. When arranged over the force-sensing layer 130 and the resistive touch sensor 120, the display can deform inwardly when a force is applied to its exterior surface, thereby locally deforming the force-sensing layer 130, which yields a change in the local bulk resistance of the force-sensitive material 131 that is detectable by the resistive touch sensor 120. In this variation, the system 100 can thus define a pressure-sensitive touchscreen, which can be integrated into a tablet, smartphone, smartwatch, or other computing device to output visual data to a user and to detect manual inputs over the display.

In this variation, the shield electrode 151 can define a continuous conductive, opaque film (or other structure) applied across the back side of the display, interposed between the display and the force-sensing layer, and configured to: block egress of light from the back side of the display; and to reject noise radiated from the display toward the resistive touch sensor 120 when actively driven to the virtual reference potential. The controller 160 can also record capacitance values of the shield electrode 151 and detect objects in contact with or near the cover layer 141 based on the capacitance values, as described below.

6. Shield Electrode as Permanent Shield

During operation, the controller 160 can persistently drive (e.g., tie, pull down) the shield electrode 151 to a virtual reference potential, such as to reject noise at the resistive touch sensor 120. The controller 160 can also float the shield electrode 151 outside of resistance scan cycles in order to reduce total power consumption per sampling period.

7. Shield Electrode as Intermittent Shield and Capacitive Sense Electrode

Alternatively, the controller 160 can execute Blocks of the method S100 to drive the shield electrode 151 to a virtual reference potential during resistance scan cycles and to read a capacitance value from the shield electrode 151 during (or before, or after) processing cycles.

7.1 Surface Capacitance

In one variation, the controller 160 implements surface capacitance techniques to read a capacitance value from the shield electrode 151 and to detect proximity and/or location of an object on or near the cover layer 141 based on this capacitance value. For example, during a capacitance scan period within a processing cycle, the controller 160 can apply a voltage to each corner of the shield electrode 151 (e.g., via four electrical traces, each extending from one corner of the shield electrode) in Block S122, which may yield a substantially uniform electrostatic field across the shield electrode. An object (e.g., a human finger) approaching or touching the cover layer 141 can bleed charge from the shield electrode. The location of this object near or in contact with the cover layer 141 may draw different levels of current from each corner of the shield electrode. The controller 160 can thus measure these levels of current draw at each corner of the shield electrode 151 and transform these current values into a location of the object near or in contact with the cover layer 141 in Blocks S122 and S124. Alternatively, the controller 160 can apply a voltage to one corner of the shield electrode, measure current leakage from the shield electrode, and determine whether a conductive object is present on or near the cover layer 141 based on this leakage current.

In this variation, the system 100 can include multiple shield electrodes, and the controller 160 can implement similar surface capacitance techniques to collect capacitance values from each shield electrode and to determine whether a conductive object is present on or near the cover layer 141—such as adjacent a particular shield electrode in the set—based on these capacitance values. For example, while testing a first shield electrode 151 in the set, the controller 160 can electrically decouple (or "float") all other shield electrodes in the set in Block S122, read a capacitance value from the first shield electrode 151 in Block S122, and then repeat this process for each other shield electrode in the system 100.

However, the controller 160 can implement any other surface capacitance techniques to collect capacitance data representative of the presence and/or location of one or more objects on or near the cover layer 141.

7.2 Projected Self-Capacitance: Secondary Electrode

Figure 9B:
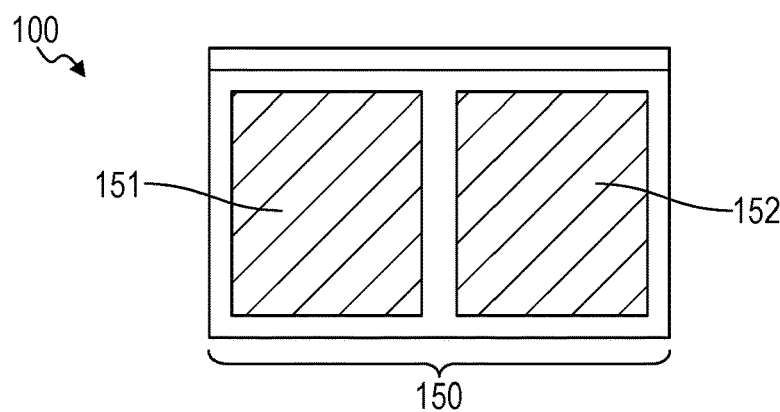

In one variation shown in FIGS. 4 and 9B, the system 100 further includes a secondary electrode arranged on the substrate 110 and configured to capacitively couple to the shield electrode; and the controller 160 implements projected capacitance techniques to read a capacitance value from the shield electrode 151 and to detect proximity and/or location of an object on or near the cover layer 141 based on this capacitance value. In particular, in this variation, the controller 160 can drive the shield electrode 151 to a virtual reference potential in a shield configuration (or to an instrument HI voltage in a guard configuration) during a resistance scan cycle in Block S110 and then read a capacitance value from the shield electrode 151 (or the secondary electrode) in Block S122 by charging and discharging the shield electrode 151 (or the secondary electrode) during a succeeding capacitance scan period. For example, the secondary electrode can include a conductive film bonded to the substrate 110, facing the force-sensing layer 130, and offset laterally from the shield electrode, such as extending along the perimeter of one or more sides of the shield electrode.

During capacitance scan periods, the controller 160 can drive the shield electrode 151 to a target voltage potential; the secondary electrode can capacitively couple to the shield electrode 151 and can leak charge from the shield electrode; and the controller 160 can track a charge time (or a discharge time, or a total charge/discharge time) for the shield electrode 151 in Block S122 before discharging the shield electrode. In particular, an object moving toward, away, or through an electrical field—formed between the ground and secondary electrodes when the shield electrode 151 (or the secondary electrode) is driven—may disrupt this electrical field, thereby affecting the charge time (or a discharge time, or a total charge/discharge time) of the shield electrode 151 (or the secondary electrode). The controller 160 can thus detect presence of an (conductive) object over the cover layer 141 and/or a size of the (conductive) object over the cover layer 141 by comparing this charge time (or the discharge time, the total charge/discharge time, or other capacitance value) for the current capacitance scan period to a charge time for a preceding capacitance scan period, to an average charge time for a set of preceding capacitance scan periods, or to a baseline charge time for the shield electrode.

In one implementation, the controller 160 stores a baseline discharge time—from a target voltage HI to a target voltage LO—for the shield electrode 151 and records a discharge time—from the target voltage HI to the target voltage LO—for the shield electrode 151 for each capacitance scan period. In this implementation, the controller 160 can determine: that a small mass is currently over the cover layer 141 if the recorded discharge time for the current capacitance scan period is slightly less than the baseline discharge time; and that a larger mass is currently over the cover layer 141 if the recorded discharge time for the current capacitance scan period is significantly less than the baseline discharge time in Block S124.

Alternatively, the controller 160 can: execute multiple capacitance scan periods during one processing cycle; record a capacitance value from the shield electrode 151 (or secondary electrode) during each capacitance scan period in Block S122; and compare these capacitance values recorded during the processing cycle to determine whether an external object is moving over or along the cover layer 141 in Block S124. For example, if a rate of change in capacitance values recorded during this processing cycle exceeds a threshold rate, the controller 160 can determine that an object is moving near or across the cover layer 141; if a rate of change in capacitance values recorded during this processing cycle remains below the threshold rate, the controller 160 can determine that an object is not moving near or across the cover layer 141.

Figure 9C:
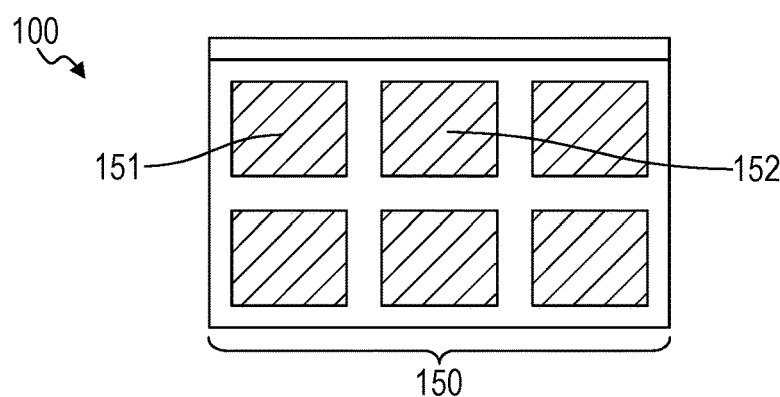

In this implementation, the system 100 can also include multiple shield electrodes patterned across (e.g., integrated into) a single plane of the force-sensing layer 130, as shown in FIG. 9C, and the controller 160 can implement similar projected self-capacitance techniques to scan each shield electrode and to determine whether an object is present on or near the cover layer 141 adjacent each shield electrode and/or to determine the location of this object on the cover layer 141. For example, each shield electrode can be independently coupled to the controller 160, such as via discrete traces running along a single tab 155 extending from the buffer layer 140 and configured to engage a receptacle 112 arranged on the substrate 110, as described above. In this example, the controller 160 can implement projected self-capacitance techniques to read a capacitance value from each shield electrode (one or more times) during a capacitance scan period in Block S122. In particular, the controller 160 can: tie all shield electrodes to a virtual reference potential during a resistance scan in Block S110; and sequentially charge and discharge each shield electrode— while floating all other shield electrodes—and record a capacitance value (e.g., a charge time, a discharge time, or a total charge/discharge time) from each shield electrode during a capacitance scan period in Block S122. The controller 160 can then transform these capacitance values into a presence and location of one or more objects on or near the cover layer 141 in Block S124.

However, the controller 160 can implement any other projected self-capacitance techniques to read a capacitance value from one or more shield electrodes (and/or a secondary electrode arranged on the substrate 110) and to transform these capacitance values into detection of an object on or near the cover layer 141.

7.3 Projected Self-Capacitance: Two Shield Electrodes

In one variation, the system 100 further includes a second shield electrode 152 coupled to (e.g., arranged over) the force-sensing layer 130 adjacent the first shield electrode 151, extending across a second region of the force-sensing layer 130, and electrically coupled to the controller 160 via the substrate 110. In this variation, the first and second shield electrodes cooperate to form an active shield across the resistive touch sensor 120 and the force-sensing layer 130 when driven to the virtual reference potential during a resistance scan cycle, thereby rejecting or reducing noise radiated toward the resistive touch sensor 120 and improving accuracy of resistance data read from the resistive touch sensor 120. In this variation, the controller 160 can also implement projected self-capacitance techniques to: read a capacitance value (e.g., a charge time, a discharge time, etc.) between the first electrode and the second electrode during a processing cycle; and to detect proximity of an object adjacent the first shield electrode 151 during the first sampling period based on this capacitance value.

In one configuration, the resistive touch sensor 120 defines a rectilinear touch area, and the system 100 includes two rectilinear shield electrodes, including a right shield electrode arranged over a right region of the resistive touch sensor 120 and a left shield electrode arranged over a left region of the resistive touch sensor 120, as shown in FIG. 9B. In this configuration, the controller 160 can: ground the left shield electrode; drive the right shield electrode to a target voltage potential such that the right shield electrode capacitively couples to the left shield electrode; read a capacitance value from the left and right shield electrodes; and determine whether an (conductive) object is near the cover layer 141 based on this capacitance value according to projected self-capacitance techniques during a processing cycle.

7.4 Projected Self-Capacitance: Multiple Shield Electrodes

In another configuration shown in FIGS. 4 and 9C, the system 100 includes a grid array of shield electrodes, such as a 2×4 grid array of eight rectangular shield electrodes, a 3×6 grid array of eighteen hexagonal shield electrodes, or a 4×8 grid array of thirty-two circular shield electrodes, each independently coupled to one channel of the controller 160. In this configuration, the grid array of shield electrodes can be arranged in a single plane over (or within) the force-sensing layer 130, and the controller 160 can implement projected self-capacitance techniques, as described above, to read capacitance values from each shield electrode during a capacitance scan period and to correlate these capacitance values with a mass over one or more shield electrodes in the grid array based on baseline capacitance values assigned to or calculated for each shield electrode.

For example, adjacent shield electrodes can be grouped as sensing electrode and sensor ground electrode pairs. In Block S110, during a capacitance scan period, the controller 160 can: tie a first sensor ground electrode to ground; drive a first sensing electrode—adjacent the first sensor ground electrode—to a target voltage potential over the first sensor ground electrode; float all other shield electrodes; and read a capacitance value from the sensing electrode representative of parasitic capacitance between the first sensing electrode and the first sensor ground electrode. The controller 160 can then float the first sensing electrode and the first sensor ground electrode and repeat this process for each other pair of sensing and sensor ground electrodes in Block S122. In this example, the controller 160 can also pair a single sensor ground electrode with multiple sensing electrodes, such as a single round sensor ground electrode centered within a cluster of four round sensing electrodes. The controller 160 can also store each capacitance value with a known location of its corresponding sensing electrode over the resistive touch sensor 120 and then process each capacitance value, as described above, to determine whether an object is located on or near the known location of each shield electrode. Therefore, in this configuration, the controller 160 can thus collect high-resolution capacitance data in Block S122 and transform these data into both whether an object is present near the cover layer 141 and an approximate location of this object over the cover layer 141 during a processing cycle based on known locations of these shield electrodes in Block S124.

However, during a resistance scan cycle, the controller 160 can drive all shield electrodes—including all sensing electrodes and sensor ground electrodes—to the virtual reference potential; the shield electrodes can thus cooperate to form an active shield across the resistive touch sensor 120 to reject or reduce noise radiated toward the resistive touch sensor 120 by external electronic circuitry.

7.5 Projected Mutual-Capacitance: Grid Array of Shield Electrodes

Figure 9D:
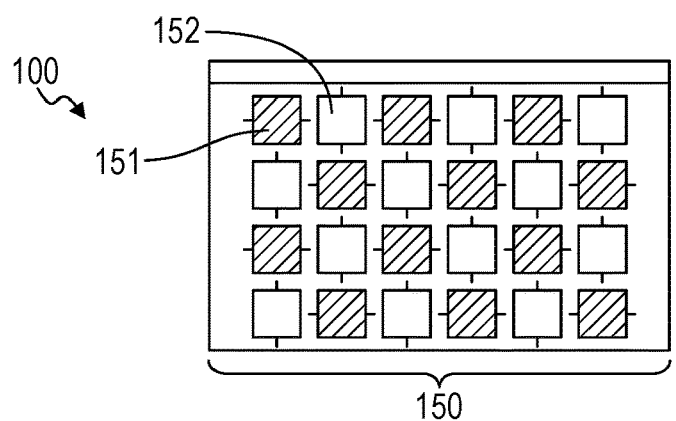

In another variation shown in FIG. 9D, the system 100 includes multiple rows of shield electrodes in a first plane and multiple columns of shield electrodes in a second plane vertically offset from (e.g., above) the first plane, and each row and each column of shield electrodes is electrically coupled to the controller 160. During a capacitance scan period, the controller 160 can sequentially float and drive each row of shield electrodes and sequentially float and ground each column of shield electrodes (or vice versa) according to projected mutual-capacitance sensing techniques in order to detect presence, size, and/or relative location of one or more objects proximal the cover layer 141 in Block S124. For example, during a capacitance scan period within a processing cycle, the controller 160 can: sequentially read capacitance values from pairs of adjacent in-row and in-column shield electrodes; generate a capacitance image representing locations and sizes of objects proximal the force-sensing layer 130 based on capacitance values read from these shield electrode pairs and baseline capacitance values and/or previous capacitance values read from these shield electrode pairs during the same or previous processing cycle; and then pair this capacitance image with a force touch image generated during the same sampling period in Block S140.

However, during a resistance scan cycle, the controller 160 can drive all rows and columns of shield electrodes to the virtual reference potential (e.g., or to an instrument LO potential or to an instrument HI potential) in Block S110; the shield electrodes can thus cooperate to form an active shield across the resistive touch sensor 120 to reject or reduce noise radiated toward the resistive touch sensor 120 by external electronic circuitry.

7.6 Multiple Shield Electrode Layers

In yet another variation, the system 100 includes multiple layers of shield electrodes. For example: the system 100 can include a first layer of shield electrodes and a second layer of shield electrodes; and the controller can drive the first layer of electrodes to the virtual ground potential during both resistance and processing periods. However, in this example, the controller can: selectively drive sense electrodes in the second layer to the virtual ground potential during resistance scan cycles, thereby cooperating with the first layer of shield electrodes to reject noise in the resistive touch sensor 120; and selectively read capacitance values from sense electrodes in the second layer during processing cycles, as described above, to detect presence of masses near the touch sensor surface.

However, the system 100 can include any other number, geometry, and/or configuration of shield electrodes, and the controller 160 can implement any other methods or techniques to read capacitance values from these shield electrodes during capacitance scan periods during operation of the system 100.

8. Touch Image

In Block S140, (e.g., during a processing cycle), the controller 160 transforms resistance data collected from the resistive touch sensor 120 during a preceding resistance scan cycle and capacitance values collected from the shield electrode(s) 150 during a concurrent or preceding capacitance scan period into a touch image representative of objects near the cover layer 141 and/or forces applied to the cover layer 141 during the current sampling period, as shown in FIG. 4. Generally, the controller 160 can generate a touch image that includes a time of the corresponding sampling period (e.g., a start time or an end time of the sampling period), an address (e.g., position) of each sense and drive electrode pair on the resistive touch sensor 120 at which a force is detected and a magnitude of this force, and an approximate position and/or size of one or more objects (i.e., masses) detected over the cover layer 141. For example, the controller 160 can generate a touch image including a first matrix representing force magnitudes—above a baseline force magnitude—applied to the cover layer 141 over each sense and drive electrode pair in the resistive touch sensor 120 and a second matrix representing a proximity and/or size of a mass detected near each shield electrode over the force-sensing layer 130. In particular, in this example, the controller 160 can: generate a force image representing magnitudes of forces applied across the cover layer 141 proportional to magnitudes of differences between a set of resistance values read during a resistance scan cycle and baseline resistance values for the resistive touch sensor 120; generate a capacitance image representing objects detected proximal the surface based on difference magnitudes between a set of capacitance values recorded during subsequent capacitance scan periods and baseline (or previous) capacitance values for the set of shield electrodes 150; align the capacitance image to the force image; and package the capacitance image and the force image into a touch image for the current sampling period.

The controller 160 can then pass this touch image to a connected device, such as a laptop computer or a tablet over a wired or wireless connection substantially in real-time. In this example, the connected device can update a connected or integrated graphical user interface according to the touch image, such as by repositioning a graphical model or manipulating a virtual control surface within the graphical user interface based on a position, size, force magnitude, and/or type of one or more force inputs represented in the first matrix and/or based on the size and/or position of adjacent masses represented in the second matrix.

The controller 160 can repeat this process for each subsequent sampling period during operation of the system 100.

8.1 Merging Resistance and Capacitance Data

In one implementation shown in FIG. 3A, during a first sampling period, the controller 160: scans the resistive touch sensor 120 during a first resistance scan cycle in Block S112; upon completion of the first resistance scan cycle, scans the shield electrodes(s) during a first capacitance scan period in Block S122 while performing initial processing on the resistance data from the first resistance scan cycle in Block S120; and then generates a first touch image for the first sampling period from the resistance data from the first resistance scan cycle and the capacitance data from the first capacitance scan period in Block S140. The controller 160 then repeats this process for a second sampling period.

In a similar implementation shown in FIG. 3B, during a first sampling period, the controller 160: scans the resistive touch sensor 120 during a first resistance scan cycle in Block S112; scans the shield electrodes(s) during a first capacitance scan period upon completion of the first resistance scan cycle in Block S122; and, during a first processing cycle, generates a first touch image for the first sampling period from the resistance data from the first resistance scan cycle and the capacitance data from the first capacitance scan period in Block S140. The controller 160 then repeats this process for a second sampling period.

In another implementation shown in FIG. 3C, during a first sampling period, the controller 160: scans the resistive touch sensor 120 during a first resistance scan cycle in Block S112; upon completion of the first resistance scan cycle, scans the shield electrodes(s) during a first capacitance scan period in Block S122 while generating a first touch image for the first sampling period from the resistance data from the first resistance scan cycle in Block S140. In this implementation, during a second sampling period, the controller 160: scans the resistive touch sensor 120 during a second resistance scan cycle in Block S112; upon completion of the second resistance scan cycle, scans the shield electrodes(s) during a second capacitance scan period in Block S122 while generating a second touch image for the first sampling period from the resistance data from the second resistance scan cycle and the capacitance data from the first capacitance scan period in Block S140. During a third sampling period, the controller 160 similarly merges resistance data from a third resistance scan cycle and capacitance data from the second capacitance scan period into a third touch image for the third sampling period in Block S140.

8.2 Multiple Capacitance Scan Periods Per Processing Cycle

As described above, the controller 160 can also execute multiple capacitance scan periods per processing cycle within one sampling period in Block S122. For example, while processing resistance values recorded during a previous resistance scan cycle, the controller 160 can: read a first set of capacitance values (e.g., charge times) between shield electrodes in the system 100 during a first capacitance scan period in Block S122; read a second set of capacitance values between these shield electrodes in Block S122; and then detect proximity of an object to a particular region of the cover layer 141 based on differences between the first set of capacitance values and the second set of capacitance values in Block S124. In particular, the controller 160 can: collect high-resolution resistance data (e.g., resistance values) through a relatively large number of sense electrode and drive electrode pairs 121 in the resistive touch sensor 120 during a resistance scan cycle; and collect low(er)-resolution capacitance data representing objects on or near the cover layer 141 through a relatively small number of shield electrodes while also processing resistance data into force (or pressure) input values during a processing cycle. Because a capacitance scan period in which a relatively small number of shield electrodes are scanned may require (significantly) less time than processing a large number of resistance values, the controller 160 can execute multiple capacitance scan periods and process resulting capacitance values into a capacitance image during a single processing cycle.

8.3 Labeling Force Areas in the Touch Image

In Block S140, the controller 160 can also characterize a type of input or input object in contact with the cover layer 141 by merging capacitance values read from the shield electrode 151 with resistance values collected from the resistive touch sensor 120.

For example, the controller 160 can correlate a small force contact area—detected through the resistive touch sensor 120 during a resistance scan cycle—and a relatively small mass over the cover layer 141—detected through the electrode in a succeeding or preceding capacitance scan period—with a pen, stylus, or small paint brush in contact with the system 100. In this example, the controller 160 can also correlate a broad force contact area and a relatively small mass over the cover layer 141 with a broad paint brush in contact with the cover layer 141, and the controller 160 can correlate a broad force contact area and a relatively large mass over the cover layer 141 with a palm or fist in contact with the system 100.

Similarly, when a user draws a substantially non-conductive stylus over the cover layer 141, the resistive touch sensor 120 can detect the presence and location of a first object in contact with the cover layer 141. However, because the stylus is substantially non-conductive, the controller 160 may not detect a (substantial) change (or "perturbation") in a capacitance value of a first shield electrode 151 proximal the detected location of the first object. The controller 160 can thus correlate the force input area of the first object detected by the resistive touch sensor 120 and the lack of capacitance change at the first shield electrode 151 with input by a non-conductive object (e.g., a stylus). In this implementation, the resistive touch sensor 120 can also detect the presence and location of a second object in contact with the cover layer 141 adjacent the first object, and the controller 160 can detect a change (or "perturbation") in a capacitance value of a second shield electrode 152 proximal the detected location of the second object. Based on the size and position of the input force area of the second object detected by the resistive touch sensor 120 and the capacitance change at the second shield electrode 152, the controller 160 can correlate the second object with a conductive object (e.g., a user's palm), reject the second object in favor of the first object, and output a touch image (described below) that includes the force magnitude and position of the force input area of the first object, exclusive of the force magnitude and position of the force input area of the second object. Alternatively, the system 100 can output a touch image that includes the force magnitudes and positions of the force input areas of both the first object and the second object but labeled (or "tagged") with object types (e.g., stylus and palm, respectively), with conductivity, or with conductivity class (e.g., non-conductive and conductive, respectively).

For example, during a processing cycle, the controller 160 can transform a set of resistance values recorded during a resistance scan cycle into: a first magnitude of a first force applied across a first contact area over the cover layer 141; a second magnitude of a second force applied across a second contact area over the cover layer 141, wherein the second contact area is distinct from and smaller than the first contact area; identify a first object proximal the first contact area as other than a stylus and identifying a second object proximal the second contact area as a stylus in response to a first perturbation represented in the set of capacitance values proximal the first contact area exceeding a second perturbation in the set of capacitance values proximal the second contact area; and then generate a touch image defining the first contact area as other than a stylus input and labeled with the first magnitude and defining the second contact area as a stylus input and labeled with the second magnitude.

9. Input Schema

In Block S140, the controller 160 can also select an input schema for characterization of forces applied to the cover layer 141 based on capacitance values read from the shield electrode(s) 150. In the implementation describe above in which the system 100 includes a left shield electrode and a right shield electrode, the controller 160 (or a computing device wired or wirelessly connected to the system 100) processes a single force input—sensed through the resistive touch sensor 120—according to a primary input scheme. However, in this implementation, when the controller 160 detects a first force input over the right side of the resistive touch sensor 120 and a second, discrete force input over the left side of the resistive touch sensor 120, the controller 160 can select an input scheme for each of the first and second force inputs based on capacitance values read from the right and left shield electrodes. In particular, the controller 160 can: read the capacitance values from the right and left shield electrodes (e.g., while resistance data from a preceding resistance scan is processed during a processing cycle); transform these capacitance values into a first approximation of a size of a mass over the right shield electrode and into a second approximation of a size of a mass over the left shield electrode; and then assign a primary input scheme to the first force input (e.g., a right hand) and assign a secondary input scheme to the second force input (e.g., a left finger) if the first approximation of the size of the mass over the right shield electrode exceeds the second approximation of the size of the mass over the left shield electrode (or vice versa).

In one example of the foregoing implementation, while a user draws a pen across the right side of the cover layer 141 with his right hand and intermittently swipes the surface of the left side of the cover layer 141 with his left index finger, the controller 160 can track the force inputs from the pen and the user's left index finger through the resistive touch sensor 120 and can track positions of masses—corresponding to the user's right hand and left index finger—through the left and right shield electrodes. Because the user's right hand may cause a greater protuberance in the capacitance value of the right shield electrode than the user's left index finger may cause in the capacitance value of the left shield electrode, the controller 160 can determine that the mass over the right electrode exceeds the mass over the left electrode. The controller 160 can then assign a primary input scheme to force inputs detected over the right side of the resistive touch sensor 120 and assign a secondary input scheme to force inputs detected over the left side of the resistive touch sensor 120 regardless of the size of the force contact areas over the right and left regions of the resistive touch sensor 120 (which may be greater for the user's index finger than for the tip of the pen). For example, a computing device connected to the system 100 can update a graphical user interface to depict a line that follows the path of the force input over the right side of the resistive touch sensor 120 according to the primary input scheme, and the computing device can update a width and/or color of a line depicted in the graphical user interface based on inputs over the left side of the resistive touch sensor 120 according to the secondary input scheme.

The controller 160 can implement similar methods and techniques to assign an input scheme to a force input detected on the resistive touch sensor 120 based on a proximity, a rate of approach, or a hover time, etc. of a mass near, toward, or over an adjacent shield electrode.

Furthermore, in this configuration, the controller 160 can detect multiple discrete force inputs across the resistive touch sensor 120, detect a mass over one or both right and left shield electrodes, and then group clusters of detected force inputs based on the estimated size of a mass over each shield electrode, as shown in FIG. 4. For example, the controller 160 can identify—from a scan of the resistive touch sensor 120 during a resistance scan cycle—that four distinct force inputs are present over the right side of the cover layer 141 and that two distinct force inputs are present over the left side of the cover layer 141. In this example, the controller 160 can then identify—from a scan of the shield electrodes during a subsequent processing cycle—that a mass is present over the right side of the cover layer 141, that a mass is present over the left side of the cover layer 141, and that the fluctuations in the capacitance value of the right rough electrode are decoupled from (e.g., do not vary at the same frequency as) fluctuations in the capacitance value of the left rough electrode. The controller 160 can thus group the four force inputs over the right side of the cover layer 141 and map this group to the user's right hand, and the controller 160 can group the two force inputs over the left side of the cover layer 141 and map this group to the user's left hand.

In this configuration, the controller 160 can also implement methods and techniques described above to intermittently activate and deactivate the resistive touch sensor 120 based on approach of a mass toward the cover layer 141 and departure of the mass from the cover layer 141, as determined from fluctuations in the capacitance values of the shield electrodes. For example, the controller 160 can selectively activate and deactivate the right side of the resistive touch sensor 120—independently of the left side of the resistive touch sensor 120—based on approach (and departure) of a mass toward the right side of the cover layer 141, as determined from fluctuations in the capacitance value of the right shield electrode, and vice versa.

10. Hover Detection and Resistive Touch Sensor Activation

In one variation, in Block S112, the controller 160 selectively activates the resistive touch sensor 120 based on detected presence of an object near the cover layer 141, as determined from perturbations in capacitance values read from the shield electrode(s) 150. For example, once the controller 160 determines that no force is present on the cover layer 141 based on resistance data collected during a resistance scan cycle and that no object is currently near the cover layer 141 based on capacitance values collected during a neighboring capacitance scan period, the controller 160 can deactivate the resistive touch sensor 120 in Block S110. However, the controller 160 can continue to scan the shield electrodes for an approaching object in Block S122 and then reactivate the resistive touch sensor 120 once an approaching mass is detected based on a perturbation in capacitance values read from the shield electrodes, thereby reducing power consumption required to scan and process data from the resistive touch sensor 120 without sacrificing sensitivity to inputs on the cover layer 141 during operation of the system 100.

In one example, at startup, the controller 160 scans both the resistive touch sensor 120 and the shield electrode; if no local force input is detected at the resistive touch sensor 120, the controller 160 deactivates the resistive touch sensor 120 and only reactivates the resistive touch sensor 120 (i.e., scans the resistive touch sensor 120 during resistance scan cycles) once proximity of a mass is detected based on a change in a capacitance value read from one or more shield electrodes. In this example, during a first resistance scan cycle of a first sampling period, the controller 160 can: drive the first shield electrode 151 to the virtual reference potential; and read a first set of resistance values across sense electrode and drive electrode pairs 121 in the resistive touch sensor 120. During a first processing cycle succeeding the first resistance scan cycle in the first sampling period, the controller 160 can: detect absence of a local force applied to the surface in response to resistance values in the first set of resistance values remaining below a default threshold resistance value; release the first shield electrode 151 from the virtual reference potential; read a first capacitance value of the first shield electrode 151; and detect absence of an object proximal the cover layer 141 during the first sampling period based on the first capacitance value. During a second resistance scan cycle of a second sampling period succeeding the first sampling period, the controller 160 can deactivate the resistive touch sensor 120 in response to detecting absence of forces applied to the cover layer 141 and absence of objects proximal the surface during the first sampling period. During a second processing cycle succeeding the second resistance scan cycle in the second sampling period, the controller 160 can: read a second capacitance value of the first shield electrode 151; and detect a first object proximal the surface during the second sampling period based on the second capacitance value. During a third sampling period (immediately) succeeding the second sampling period, the controller 160 can drive the first shield electrode 151 to the virtual reference potential and read a third set of resistance values during the third resistance scan cycle of the third sampling period in response to detecting the first object proximal the surface during the second sampling period.

The controller 160 can therefore track changes in capacitance values of the shield electrode over time in order to detect a mass approaching—but not touching—the cover layer 141 in Block S124 and to selectively activate and deactivate the resistive touch sensor 120 accordingly in Block S110. The controller 160 can implement similar methods and techniques to track a mass removed from—but still near—the cover layer 141. For example, the controller 160 can be configured to detect a change in the capacitance value of the shield electrode 151 for an adjacent mass up to 1″ from the cover layer 141. In this example, following application of and subsequent removal of a force on the surface of the cover layer 141, the controller 160 can continue to scan and process resistance values from the resistive touch sensor 120 until no detectable change in the capacitance value of the shield electrode 151 is read from the shield electrode 151 or until a rate of change in capacitance value of the shield electrode 151 remains below a threshold rate for a threshold duration of time.

11. Local Sensitivity Adjustment

Figure 7A:
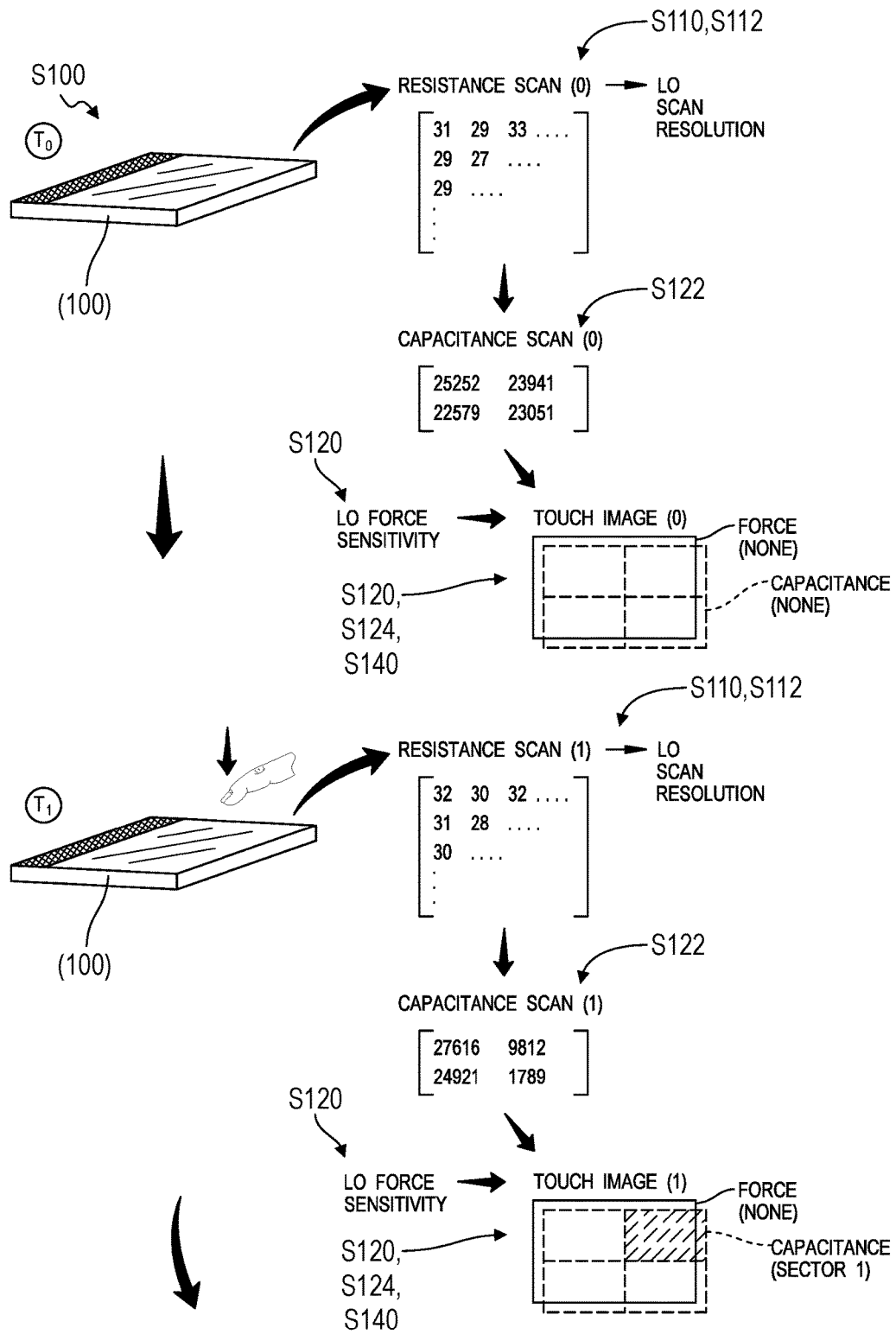
FIGS. 7A and 7B are flowchart representations of one variation of the method.
Figure 7B:
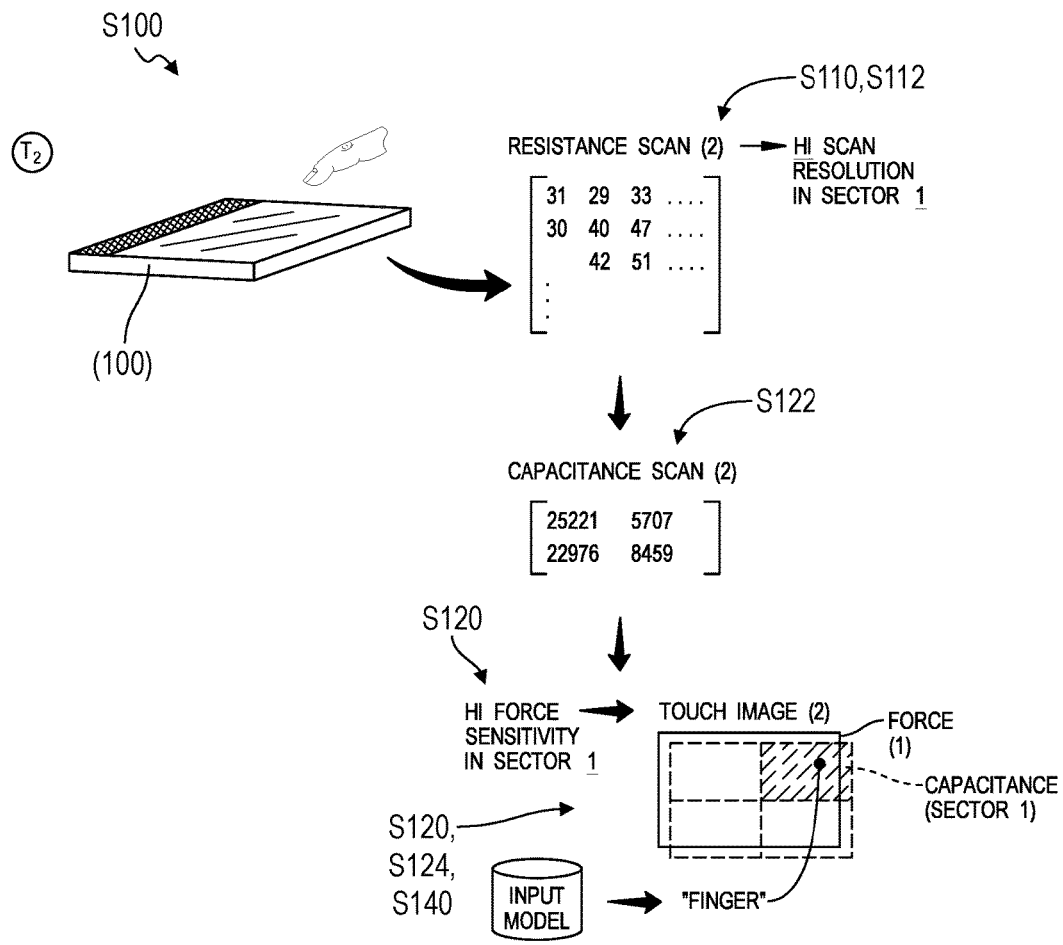

In another variation shown in FIGS. 7A and 7B, in Block S120, the controller 160 selectively adjusts a force input sensitivity applied to resistance data collected during a resistance scan cycle based on capacitance data collected during a previous (or concurrent) capacitance scan period.

For example, if the controller 160 detects no local application of force on the cover layer 141 based on resistance values collected during preceding resistance scan cycles but does detect an object near (e.g., approaching) a particular subregion of the cover layer 141 based on capacitance values collected during a preceding capacitance scan period, the controller 160 can: assign a high input sensitivity to a first subset of sense electrode and drive electrode pairs 121—in the resistive touch sensor 120—adjacent (and extending slightly beyond) this particular subregion of the cover layer 141 while persisting a low(er) input sensitivity to all other (i.e., a second subset of) sense electrode and drive electrode pairs 121 in the resistive touch sensor 120. In this example, the controller 160 can: compare resistance values recorded from the first subset of sense electrode and drive electrode pairs 121 during a resistance scan cycle to a relatively small resistance change threshold; and thus detect application of a force to the cover layer 141 within or proximal the particular subregion if a resistance value—read from a sense electrode and drive electrode pair 121 within the first subset—differs from 1) a baseline resistance value or 2) a resistance value recorded from this sense electrode and drive electrode pair 121 during a previous sampling period by more than this relatively small, high-sensitivity resistance change threshold. However, the controller 160 can detect application of a force to the cover layer 141 outside of the particular subregion only if a resistance value—read from a sense electrode and drive electrode pair 121 in the second subset—differs from 1) the baseline resistance value or 2) a resistance value recorded from this sense electrode and drive electrode pair 121 during a previous sampling period by more than a relatively large, low(er)-sensitivity resistance change threshold.

In one implementation, the controller 160 can drive the set of shield electrodes 150 to the virtual reference potential and read a first set of resistance values across sense electrode and drive electrode pairs 121 in the resistive touch sensor 120 during a first resistance scan cycle of a first sampling period. The controller 160 can then detect absence of a local force applied to the surface in response to resistance values in the first set of resistance values remaining below a default threshold resistance value; release the set of shield electrodes 150 from the virtual reference potential; read a first set of capacitance values of the set of shield electrodes 150; and detect absence of an object proximal the cover layer 141 during the first sampling period based on the first set of capacitance values during a first processing cycle succeeding the first resistance scan cycle in the first sampling period. During a second resistance scan cycle of a second sampling period succeeding the first sampling period, the controller 160 can: drive the set of shield electrodes 150 to the virtual reference potential; and read a second set of resistance values across sense electrode and drive electrode pairs 121 in the resistive touch sensor 120. During a second processing cycle succeeding the second resistance scan cycle in the second sampling period, the controller 160 can: detect absence of a local force applied to the cover layer 141 in response to resistance values in the second set of resistance values remaining below the default threshold resistance value; release the set of shield electrodes 150 from the virtual reference potential; read a second set of capacitance values of the set of shield electrodes 150; and detect a first object proximal a particular location on the cover layer 141 during the second sampling period based on the second set of capacitance values. During a third resistance scan cycle of a third sampling period succeeding the second sampling period, the controller 160 can: drive the set of shield electrodes 150 to the virtual reference potential; and read a third set of resistance values across sense electrode and drive electrode pairs 121 in the resistive touch sensor 120. During a third processing cycle succeeding the third resistance scan cycle in the third sampling period and in response to detecting the first object proximal the particular location on the cover layer 141 during the second sampling period, the controller 160 can: select a second (i.e., high-sensitivity) resistance change threshold less than the default resistance change threshold; and detect a first force applied to the surface at a first position proximal the particular location of the first object according to a particular resistance value—in the third set of resistance values and corresponding to the first position—exceeding the second threshold resistance value.

The controller 160 can therefore implement a greater sensitivity to changes in resistance values read from the resistive touch sensor 120—which correlate to changes in local forces applied to the cover layer 141—across all or a particular subset of sense electrode and drive electrode pairs 121 in the resistive touch sensor 120 based on presence of an object detected near the cover layer 141 based on capacitance values read from the shield electrode(s) 150 during processing cycles throughout operation of the system 100.

The controller 160 can implement similar methods and techniques to adjust sensitivity to force inputs on the cover layer 141 proportional to a detected size of an object approaching the cover layer 141. For example, the controller 160 can: detect a relatively small perturbation in capacitance value at a first shield electrode 151; associate this small perturbation with approach of an object of relatively small mass toward a first region of the cover layer 141 adjacent the first shield electrode 151; and selectively apply a lower resistance change threshold to resistance values read from a first subset of sense electrode and drive electrode pairs 121 adjacent this first region in order to achieve greater sensitivity to force inputs applied to the cover layer 141 with small objects, such as with a stylus or finger. Conversely, the controller 160 can: detect a relatively large perturbation in capacitance value at a second shield electrode 152; associate this large perturbation with approach of an object of relatively large mass toward a second region of the cover layer 141 adjacent the second shield electrode 152; and selectively apply a higher resistance change threshold to resistance values read from a second subset of sense electrode and drive electrode pairs 121 adjacent this second region in order to reduce sensitivity to force inputs applied to the cover layer 141 with larger objects, such as with a palm or forearm.

The controller 160 can implement similar methods and techniques to adjust sensitivity to force inputs on the cover layer 141 proportional to a speed at which an object approaches the cover layer 141. For example, the controller 160 can: estimate a rate at which an object approaches a region of the cover layer 141 based on a rate of change in capacitance values read from an adjacent shield electrode over a sequence of sampling periods; and then adjust a resistance change threshold—for resistance values read from a subset of sense electrode and drive electrode pairs 121 adjacent this region—inversely proportion to the approach speed of the object. The controller 160 can thus achieve a high sensitivity to input forces that approach the cover layer 141 slowly and a lower sensitivity to input forces that approach the cover layer 141 quickly.

12. Local Resolution Adjustment

In another variation shown in FIGS. 7A and 7B, in Block S110, the controller 160 selectively adjusts a resolution with which the controller 160 scans sense electrode and drive electrode pairs 121 in the resistive touch sensor 120 during a current resistance scan cycle based on capacitance data collected during a previous (or concurrent) capacitance scan period. For example, if the controller 160 detects no local application of force on the cover layer 141 based on resistance values collected during preceding resistance scan cycles but does detect an object near (e.g., approaching) a particular subregion of the cover layer 141 based on capacitance values collected during a preceding capacitance scan period, the controller 160 can: assign a high scanning resolution to a first subset of sense electrode and drive electrode pairs 121—in the resistive touch sensor 120—adjacent this particular subregion of the cover layer 141; while persisting a low(er) scan resolution across all other (i.e., a second subset of) sense electrode and drive electrode pairs 121 in the resistive touch sensor 120. In this example, the controller 160 can scan each sense electrode and drive electrode pair 121 in the first subset according to the high scanning resolution assigned to the first subset but scan only every fourth sense electrode and drive electrode pair 121 in the second subset according to the low scanning resolution assigned to the second subset.

The controller 160 can thus collect a greater density of resistance data from sense electrode and drive electrode pairs 121 proximal a mass near or approaching the cover layer 141 than at other sense electrode and drive electrode pairs 121 substantially remote from such external masses. Therefore, by collecting less total data per resistance scan cycle, the controller 160 can process these data in less time and achieve a greater refresh rate (e.g., rate of touch images output per unit time) without (substantially) sacrificing resolution across regions of the resistive touch sensor 120 at which inputs are most likely to occur. Furthermore, once an input is detected on the cover layer 141 based on resistance data collected during a resistance scan cycle, the controller 160 can continue to implement this method to selectively increase or decrease scan resolutions in select regions of the resistive touch sensor 120 based on capacitance values read from the shield electrode(s) 150 during neighboring capacitance scan periods.

The controller 160 can also implement methods and techniques similar to those described above to adjust scan resolutions in select regions of the resistive touch sensor 120 proportional to a detected size of an object approaching the cover layer 141. For example, the controller 160 can increase the scan resolution in a particular region of the resistive touch sensor 120 in response to detection of a relatively small object approaching an adjacent region of the cover layer 141; and vice versa. The controller 160 can thus match the scan resolutions of a region of the resistive touch sensor 120 to a size of an objet approaching this region of the resistive touch sensor 120 in order to limit a total amount of resistance values collected during a scan cycle and to reduce a processing time for these resistance data without (substantially) sacrificing detection and location of a point of contact between the object and cover layer 141.

The controller 160 can implement similar methods and techniques to adjust scan resolutions in select regions of the resistive touch sensor 120 proportional to a speed at which an object approaches the cover layer 141. For example, the controller 160 can increase the scan resolution in a particular region of the resistive touch sensor 120 in response to detection of an object rapidly approaching an adjacent region of the cover layer 141; and vice versa. The controller 160 can thus match the scan resolutions of a region of the resistive touch sensor 120 to a speed at which an object approaches this region of the resistive touch sensor 120.

However, the controller 160 can implement any other methods or techniques to activate the resistive touch sensor 120, adjust a scan resolution of the resistive touch sensor 120, adjust sensitivity to inputs detected by the resistive touch sensor 120, etc. based on capacitance values read from the shield electrode(s) 150 and/or based on objects near the cover layer 141 detected based on these capacitance values.

13. Moisture Detection

In one variation, the controller 160 is further configured to detect moisture on the cover layer 141 and to modify its operation accordingly. For example, in Block S140, the controller 160 can: read a capacitance value of a shield electrode during a capacitance scan period within a sampling period; detect moisture on the cover layer 141 based on the capacitance value; and then, in response to detecting moisture on the surface, clear a touch image—generated during the sampling period—of any representation of forces applied to the surface and objects proximal the surfaces.

In one implementation in which the system 100 includes an array of shield electrodes over the force-sensing layer 130, the controller 160 detects fluid flowing across the surface based on a rapid increase in leakage current, a rapid increase in charge time, and/or a rapid decrease in discharge time across a large proportion of (e.g., all) shield electrodes over a short number of sampling periods. In another implementation, the controller 160 detects multiple light, transient impacts on the cover layer 141 over a sequence of sampling periods and then implements pattern matching (or similar) techniques to characterize these transient impacts as rain falling onto the cover layer 141. In this implementation, the controller 160 can also confirm presence of water on the cover layer 141 as a result of rainfall in response to changes in capacitance values read from the shield electrode(s) 150 over the same sampling periods. Once presence of such moisture is detected, the controller 160 can cease scanning the resistive touch sensor 120 and/or the shield electrode(s) 150 and instead output empty touch images. In another example, in response to detecting moisture on the surface, the controller 160 can cease output of touch images and transition into an inactive (or "sleep") mode for a preset duration of time. In this example, in response to detecting moisture on the surface, the controller 160 can also output a command to a connected computing device to similarly transition into an inactive state, such as for a preset duration of time and until such moisture is removed from the cover layer 141.

However, the controller 160 can implement any other method or technique to detect and respond to moisture on the cover layer 141 based on resistance and/or capacitance values collected during operation of the system 100.

14. Calibration

Figure 8:
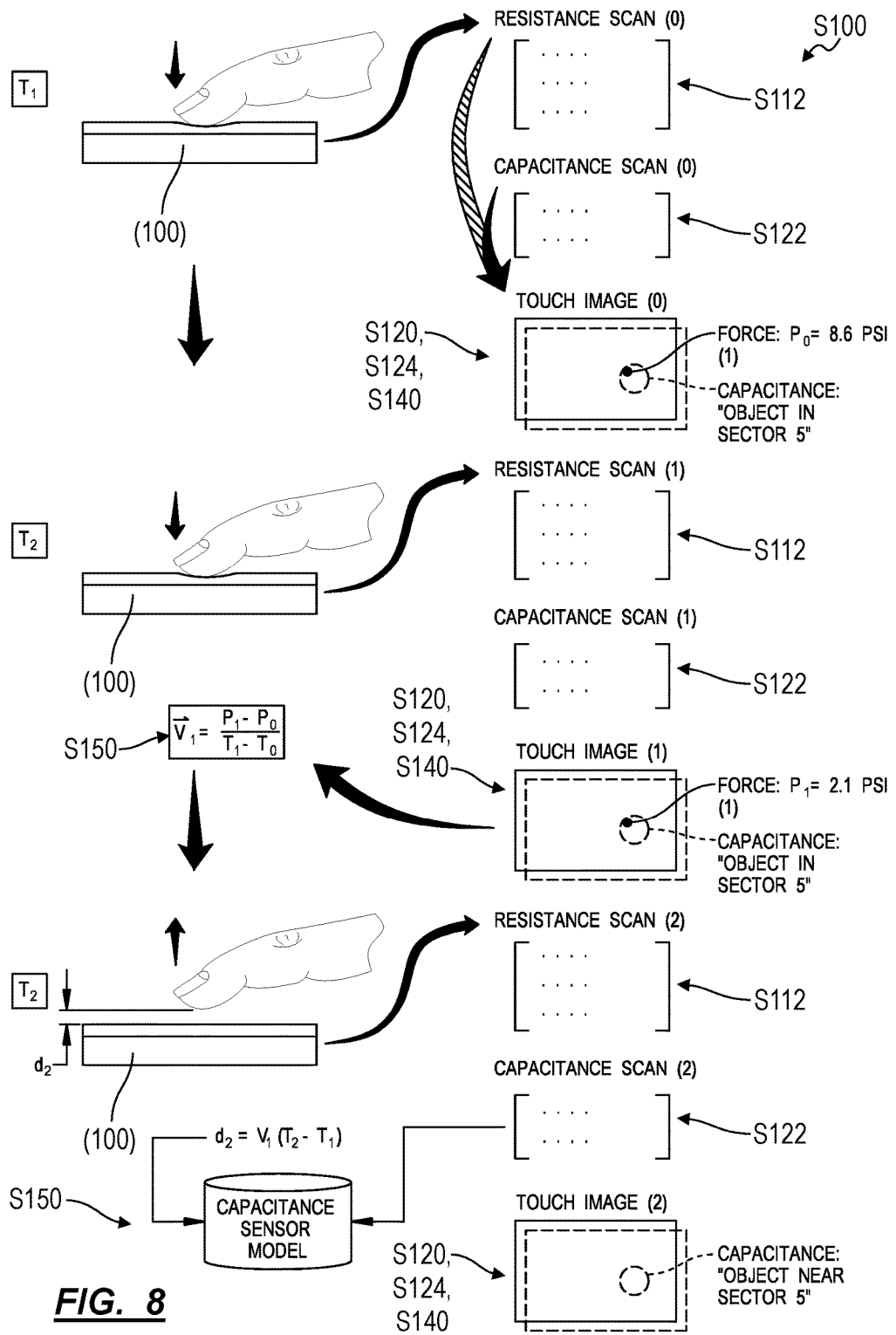
FIG. 8 is a flowchart representation of one variation of the method.

In one variation shown in FIG. 8, the controller 160 calibrates a capacitive sensor model for the shield electrode(s) 150 based on resistance data collected from the resistive touch sensor 120 in Block S150. For example, the controller 160 can calibrate the capacitive sensor model in Block S150 upon startup, when a new or different overlay is installed over the cover layer 141, or occasionally (once per three-minute interval) during operation of the system 100.

In this variation, the controller 160 can: at a first time, correlate a first change in a resistance across a sense electrode and drive electrode pair 121 in the resistive touch sensor 120 with application of a mass to a surface of the resistive touch sensor 120 (e.g., the cover layer 141, an overlay installed over the cover layer 141); at a second time succeeding the first time, correlate a second change in the resistance across the sense electrode and drive electrode pair 121 with release of the mass from the surface of the resistive touch sensor 120; at approximately the second time, read a capacitance value at a shield electrode coincident the sense electrode and drive electrode pair 121; and correlate the capacitance value at the ground/sense electrode with proximity of the mass to the resistive touch sensor 120 but not contacting the cover layer 141 (or the overlay). For example, the controller 160 can detect application of an overlay over the cover layer 141 based on detection of an approximately uniform rise in applied force across all drive and sense electrode pairs 121 in the resistive touch sensor 120 within a threshold period of time, and the controller 160 can then implement the foregoing method to recalibrate a baseline capacitance value ("the capacitive sensor model") for the shield electrode(s) 150.

Furthermore, in this variation, the controller 160 can: over a first period of time between the first time and the second time, calculate a rate of change in the resistance across the sense electrode and drive electrode pair 121; estimate a rate of retraction of the mass from the surface of the resistive touch sensor 120 based on the rate of change in the resistance across the sense electrode and drive electrode pair 121; over a second period of time succeeding the second time, read a sequence of capacitance values at the shield electrode 151 coincident the contact location; and correlate capacitance values in the sequence of capacitance values with estimated distances between the surface of the touch resistive sensor and the mass based on the estimated rate of retraction of the mass from the surface. The controller 160 can therefore estimate a rate of departure of a mass from a surface over the resistive touch sensor 120 (e.g., from the cover layer 141, from an overlay installed over the cover layer 141) based on a rate of change of a magnitude of a force input detected by the resistive touch sensor 120, and the controller 160 can estimate the position of the mass above the location of the force input based on the estimated rate of departure following release of the mass from the surface (e.g., based on return of the detected force magnitude at the location to a baseline force magnitude). The controller 160 can then map estimated positions of the mass over time following its release from the surface to capacitance values read from a shield electrode—adjacent (i.e., below) the location of the force input—at a corresponding time to generate a capacitance-value-based mass position model for the shield electrode.

In one example shown in FIG. 8, during a first sampling period, the controller 160 can: collect resistance data from the resistive touch sensor 120 in Block S112; and then transform a first change in resistance between a particular sense electrode and drive electrode pair 121 in the resistive touch sensor 120 into a first magnitude of a force applied to a first position (adjacent the particular sense electrode and drive electrode pair) on the cover layer 141 in Block S120. During a second sampling period succeeding the first sampling period, the controller 160 can: drive the set of shield electrodes 150 to the virtual reference potential in Block S110; read a second set of resistance values across sense electrode and drive electrode pairs 121 in Block S112; and transform a second change in resistance between the particular sense electrode and drive electrode pair 121 into a second magnitude of the force applied to the cover layer 141 proximal the first position in Block S120. Furthermore, during a third sampling period succeeding the second sampling period, the controller 160 can: drive the set of shield electrodes 150 to the virtual reference potential in Block S110; read a third set of resistance values across sense electrode and drive electrode pairs 121 in Block S112; detect removal of the force from the cover layer 141 based on a third change in resistance, in the set of resistance values, between the particular sense electrode and drive electrode pair 121 in Block S120; and then read a third capacitance value of a shield electrode adjacent (e.g., under) the first position on the cover layer 141. The controller 160 can thus calculate a speed of removal of the first object from the cover layer 141 based on a difference between the first magnitude and the second magnitude of the force and based on a difference in time from the first sampling period to the second sampling period. Once removal of an object on the cover layer 141 over the first position is detected by the third sampling period, the controller 160 can also interpolate a particular distance between the cover layer 141 and the object at the third sampling period based on the speed of removal of the object from the cover layer 141 and a difference in time from the second sampling period to the third sampling period. Finally, the controller 160 can associate the third capacitance value—read from the first shield electrode 151 adjacent the first position—with the particular distance, thereby calibrating the first shield electrode 151 for distances from objects near but not in contact with the cover layer 141. In this example, the controller 160 can store this particular distance and the third capacitance value (or a capacitance change rate or a relative capacitance difference from a preceding sampling period to the third sampling period, etc.) in the capacitance sensor model. The controller 160 can also: estimate a size of the object based on a force contact area at the first position during a preceding sampling period (e.g., the first sampling period); predict a type of the object, as described above; and associate the estimated size of the object, the predicted type of the object, and/or the third capacitance value with this particular distance in the capacitance sensor model in Block 150.

Alternatively, the controller 160 can store static capacitance sensor models—such as including baseline capacitance values, baseline or threshold capacitance change rates, and/or capacitance-value-based mass position models, etc.—for each shield electrode in the system 100.

15. Error Reduction

In one variation, during a resistance scan cycle, the controller 160 can read analog voltage values between an instrument LO voltage and an instrument HI voltage at drive and sense electrode pairs 121 in the resistive touch sensor 120. In order to minimize errors due to capacitive coupling between the shield electrode(s) 150 and the resistive touch sensor 120 during resistance scan cycles, the controller 160 can: hold the shield electrode(s) 150 to the instrument LO voltage (e.g., a virtual reference potential) and scan the resistive touch sensor 120 during a first segment of the resistance scan cycle; pull the shield electrode(s) 150 up to the instrument HI voltage and scan the resistive touch sensor 120 during a second segment of the resistance scan cycle; and then average resistance values scanned from the resistive touch sensor 120 during the first and second segments of the resistance scan cycle before processing these resistance data during the subsequent resistance processing cycle. Similarly, the controller 160 can oscillate between pulling the shield electrode(s) 150 down to the instrument LO voltage and up to the instrument HI voltage for succeeding resistance scan cycles and average resistance data from a current and a last resistance scan cycle in order to reject or reduce noise in these resistance data due to capacitive coupling between the resistive touch sensor 120 and the shield electrode(s) 150.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system comprising:
   a substrate;
   a resistive touch sensor arranged across the substrate and comprising an array of sense electrode and drive electrode pairs;
   a force-sensing layer arranged over the resistive touch sensor opposite the substrate and comprising a force-sensitive material exhibiting variations in local bulk resistance responsive to local variations in applied force;
   a first shield electrode coupled to the force-sensing layer, extending across a first region of the force-sensing layer, and electrically coupled to the substrate; and
   a controller coupled to the substrate and configured to:
      during a first resistance scan cycle in a first sampling period:
         drive the first shield electrode to a virtual reference potential; and read resistance values across sense electrode and drive electrode pairs in the resistive touch sensor; and during a first processing cycle succeeding the first resistance scan cycle within the first sampling period:

release the first shield electrode from the virtual reference potential; and transform resistance values read from sense electrode and drive electrode pairs in the force-sensing layer into a force touch image, the force touch image representing locations and force magnitudes of objects applied over the force-sensing layer.

2. The system of claim 1:

further comprising a second shield electrode coupled to the force-sensing layer adjacent the first shield electrode, extending across a second region of the force-sensing layer, and electrically coupled to the substrate;

wherein the controller is configured:

to read a capacitance value between the first electrode and the second electrode during the processing cycle of the first sampling period;

to detect proximity of a mass adjacent the first shield electrode during the first sampling period based on the capacitance value.

3. The system of claim 2:

further comprising a grid array of shield electrodes patterned across the force-sensing layer in a set of rows in a first plane and a set of columns in a second plane offset from the first plane, the grid array of shield electrodes comprising the first shield electrode and the second shield electrode;

wherein the controller is configured:

to sequentially read capacitance values from shield electrodes in the grid array of shield electrodes during the processing cycle of the first sampling period;

to generate a capacitance image representing locations and sizes of objects proximal the force-sensing layer; and to pair the capacitance image with the force touch image for the first sampling period.

4. The system of claim 1, wherein the controller is configured to:

during the first processing cycle in the first sampling period:

transform resistance values read from sense electrode and drive electrode pairs during the first resistance scan cycle into the force touch image based on a default resistance change threshold;

during a second resistance scan cycle in a second sampling period succeeding the first sampling period:

drive the first shield electrode to the virtual reference potential; and read a second set of resistance values across sense electrode and drive electrode pairs in the resistive touch sensor;

during a second processing cycle in the second sampling period:

release the first shield electrode from the virtual reference potential; and select a second resistance change threshold less than the default resistance change threshold in response to detecting proximity of the mass adjacent the first shield electrode during the first sampling period; and transform the second set of resistance values read from sense electrode and drive electrode pairs into a second force touch image based on the second resistance change threshold.

5. The system of claim 1:

wherein the force-sensing layer comprises an elastic buffer layer;

wherein the force-sensitive material is applied across a first side of the elastic buffer layer and faces the resistive touch sensor;

wherein the first shield electrode is interposed between the elastic buffer layer and the force-sensitive material; and further comprising an electrical trace extending from the first shield electrode to a perimeter of the elastic buffer layer and configured to mate with an electrical pad on the substrate to electrically couple the first shield electrode to the controller.

6. The system of claim 1, wherein the first shield electrode comprises:

a conductive metallic film defining a perimeter of the first shield electrode; and a conductive carbon film spanning the first region of the force-sensing layer bounded by the conductive metallic film.

7. The system of claim 1, wherein the force-sensing layer comprises an elastic buffer layer;

wherein the force-sensitive material is applied across a first side of the elastic buffer layer and faces the resistive touch sensor;

wherein the first shield electrode extends across a second side of the elastic buffer layer opposite the force-sensitive material; and further comprising:

a cover layer adhered to the second side of the elastic buffer layer over the first shield electrode; and a plug electrically coupled to the shield electrode, extending beyond a perimeter of the force-sensing layer, and configured to engage a receptacle mounted to the substrate to electrically couple the first shield electrode to the controller.

8. The system of claim 1:

further comprising a display arranged over the force-sensing layer opposite the substrate; and wherein the first shield electrode is interposed between the display and the force-sensing layer.

9. The system of claim 1, wherein the substrate, the resistive touch sensor, and the force-sensing layer cooperate to define an opaque touchpad integrated into a C-side of a computing device.

10. A method for detecting and characterizing force inputs on a surface, the method comprising:

during a first resistance scan cycle of a first sampling period:

driving a first shield electrode arranged over a resistive touch sensor to a virtual reference potential; and reading a first set of resistance values across sense electrode and drive electrode pairs in the resistive touch sensor;

during a first processing cycle succeeding the first resistance scan cycle of the first sampling period:

transforming the first set of resistance values into a first position and a first magnitude of a first force applied to a tactile surface over the shield electrode;

releasing the first shield electrode from the virtual reference potential;

reading a first capacitance value of the first shield electrode; and detecting proximity of a first object to the tactile surface based on the first capacitance value; and generating a first touch image representing the first position and the first magnitude of the first force on the tactile surface for the first sampling period based on the proximity of the first object to the tactile surface.

11. method of claim 10, wherein driving the first shield electrode to the virtual reference potential during the first resistance scan cycle of the first sampling period comprises driving a set of shield electrodes to a virtual ground potential, the set of shield electrodes comprising the first shield electrode and arranged in known locations over a force-sensing layer, the force-sensing layer arranged over the resistive touch sensor and comprising a force-sensitive material exhibiting variations in local bulk resistance responsive to local variations in applied force; and wherein releasing the first shield electrode from the virtual reference potential and reading the first capacitance value of the first shield electrode during the processing cycle of the first sampling period comprise reading a first set of capacitance values between shield electrodes in the set of shield electrodes.

12. The method of claim 11:

wherein driving the set of shield electrodes to the virtual ground potential comprises driving each shield electrode in the set of shield electrodes to the virtual ground potential to shield the resistive touch sensor from external radiated electromagnetic power during the first resistance scan cycle of the first sampling period;

wherein reading the first set of capacitance values comprises sequentially charging and recording a first set of charge times of shield electrodes in the set of shield electrodes during the first processing cycle of the first sampling period; and wherein generating the first touch image comprises:

generating a first force image representing magnitudes of forces applied across the tactile surface proportional to magnitudes of differences between the first set of resistance values and baseline resistance values for the resistive touch sensor; and generating a first capacitance image representing objects detected proximal the tactile surface based on magnitudes of difference between the first set of capacitance values and baseline capacitance values for the set of shield electrodes, the first capacitance image aligned to the first force image.

13. The method of claim 12:

further comprising reading a second set of capacitance values between shield electrodes in the set of shield electrodes by sequentially charging and recording a second set of charge times of shield electrodes in the set of shield electrodes during the first processing cycle of the first sampling period; and wherein detecting proximity of the first object to the tactile surface comprises detecting proximity of the first object to a particular region of the tactile surface based on the first set of charge times and the second set of charge times.

14. The method of claim 11, wherein transforming the first set of resistance values into the position and the magnitude of the first force comprises transforming the first set of resistance values into:

the first magnitude of the first force applied across a first contact area over the tactile surface;

a second magnitude of a second force applied across a second contact area over the tactile surface, the second contact area distinct from and smaller than the first contact area, wherein detecting proximity of the first object to the tactile surface comprises, in response to a first perturbation represented in the first set of capacitance values proximal the first contact area exceeding a second perturbation in the first set of capacitance values proximal the second contact area:

identifying the first object proximal the first contact area as other than a stylus; and identifying a second object proximal the second contact area as a stylus; and wherein generating the first touch image comprises generating the first touch image defining:

the first contact area as other than a stylus input and labeled with the first magnitude; and the second contact area as a stylus input and labeled with the second magnitude.

15. The method of claim 10, further comprising:

during a third resistance scan cycle of a third sampling period preceding the first sampling period:

driving the first shield electrode to the virtual reference potential;

reading a third set of resistance values across sense electrode and drive electrode pairs in the resistive touch sensor at a default resolution;

during a third processing cycle succeeding the third resistance scan cycle in the third sampling period:

detecting absence of local forces applied to the tactile surface based on the third set of resistance values;

releasing the first shield electrode from the virtual reference potential;

reading a third capacitance value of the first shield electrode; and detecting absence of an object proximal the tactile surface during the third sampling period based on the third capacitance value;

during a second resistance scan cycle of a second sampling period preceding the first sampling period and succeeding the third sampling period:

driving the first shield electrode to the virtual reference potential;

reading a second set of resistance values across sense electrode and drive electrode pairs in the resistive touch sensor at a default resolution;

during a second processing cycle succeeding the second resistance scan cycle in the second sampling period:

detecting absence of local forces applied to the tactile surface based on the second set of resistance values;

releasing the first shield electrode from the virtual reference potential;

reading a second capacitance value of the first shield electrode; and detecting the first object offset from and proximal a particular location on the tactile surface during the second sampling period based on the second capacitance value; and wherein reading the first set of resistance values across sense electrode and drive electrode pairs during the first resistance scan cycle of the first sampling period comprises, in response to detecting the first object proximal the particular location on the tactile surface:
sampling a first subset of the sense electrode and drive electrode pairs remote from the particular location at the default resolution; and
sampling a second subset of the sense electrode and drive electrode pairs proximal the particular location at a second resolution greater than the default resolution.

16. The method of claim 10,
further comprising:
during a third resistance scan cycle of a third sampling period preceding the first sampling period:
driving the first shield electrode to the virtual reference potential;
reading a third set of resistance values across sense electrode and drive electrode pairs in the resistive touch sensor;
during a third processing cycle succeeding the third resistance scan cycle in the third sampling period:
detecting absence of a local force applied to the tactile surface in response to resistance values in the third set of resistance values remaining below a default threshold resistance value;
releasing the first shield electrode from the virtual reference potential;
reading a third capacitance value of the first shield electrode; and
detecting absence of an object proximal the tactile surface during the third sampling period based on the third capacitance value;
during a second resistance scan cycle of a second sampling period preceding the first sampling period and succeeding the third sampling period:
driving the first shield electrode to the virtual reference potential;
reading a second set of resistance values across sense electrode and drive electrode pairs in the resistive touch sensor;
during a second processing cycle succeeding the second resistance scan cycle in the second sampling period:
detecting absence of a local force applied to the tactile surface in response to resistance values in the second set of resistance values remaining below the default threshold resistance value;
releasing the first shield electrode from the virtual reference potential;
reading a second capacitance value of the first shield electrode; and
detecting the first object proximal a particular location on the tactile surface during the second sampling period based on the second capacitance value; and
wherein transforming the first set of resistance values into the first position and the first magnitude of the first force applied to the tactile surface comprises, in response to detecting the first object proximal the particular location on the tactile surface during the second sampling period:
detecting the first force applied to the tactile surface at the first position proximal the particular location according to a particular resistance value, in the first set of resistance values and corresponding to the first position, exceeding a second threshold resistance value, the second threshold resistance value less than the default threshold resistance value.

17. The method of claim 10,
further comprising:
during a third resistance scan cycle of a third sampling period preceding the first sampling period:
driving the first shield electrode to the virtual reference potential;
reading a third set of resistance values across sense electrode and drive electrode pairs in the resistive touch sensor;
during a third processing cycle succeeding the third resistance scan cycle in the third sampling period:
detecting absence of a local force applied to the tactile surface in response to resistance values in the third set of resistance values remaining below a default threshold resistance value;
releasing the first shield electrode from the virtual reference potential;
reading a third capacitance value of the first shield electrode; and
detecting absence of an object proximal the tactile surface during the third sampling period based on the third capacitance value;
during a second resistance scan cycle of a second sampling period preceding the first sampling period and succeeding the third sampling period:
deactivating the resistive touch sensor in response to detecting absence of forces applied to the tactile surface and absence of objects proximal the tactile surface during the third sampling period;
during a second processing cycle succeeding the second resistance scan cycle in the second sampling period:
reading a second capacitance value of the first shield electrode; and
detecting the first object proximal the tactile surface during the second sampling period based on the second capacitance value; and
wherein driving the first shield electrode to the virtual reference potential and reading the first set of resistance values during the first resistance scan cycle of the first sampling period comprises driving the first shield electrode to the virtual reference potential and reading the first set of resistance values during the first resistance scan cycle of the first sampling period in response to detecting the first object proximal the tactile surface during the second sampling period.

18. The method of claim 10, further comprising, during a second sampling period succeeding the first sampling period:
reading a second capacitance value of the first shield electrode;
detecting moisture on the tactile surface based on the second capacitance value; and
clearing a second touch image, generated during the second sampling period, of representation of forces applied to the tactile surface and objects proximal the tactile surfaces in response to detecting moisture on the tactile surface.

19. The method of claim 10:
wherein transforming the first set of resistance values into the first position and the first magnitude of the first force applied to the tactile surface comprises transforming a first change in resistance between a particular sense electrode and drive electrode pair in the resistive touch sensor into the first magnitude of the first force applied to the tactile surface at the first position, the particular sense electrode and drive electrode pair adjacent the first position;

further comprising:

during a second sampling period succeeding the first sampling period:

driving the first shield electrode to the virtual reference potential;

reading a second set of resistance values across sense electrode and drive electrode pairs in the resistive touch sensor;

transforming a second change in resistance between the particular sense electrode and drive electrode pair into a second magnitude of the first force applied to the tactile surface at the first position;

during a third resistance scan cycle of a third sampling period succeeding the second sampling period:

driving the first shield electrode to the virtual reference potential;

reading a third set of resistance values across sense electrode and drive electrode pairs in the resistive touch sensor;

during a third processing cycle succeeding the third resistance scan cycle of the third sampling period:

detecting removal of the first force from the tactile surface based on a third change in resistance, in the set of resistance values, between the particular sense electrode and drive electrode pair;

releasing the first shield electrode from the virtual reference potential;

reading a third capacitance value of the first shield electrode;

calculating a speed of removal of the first object from the tactile surface based on a difference between the first magnitude and the second magnitude of the first force and based on a difference in time from the first sampling period to the second sampling period;

interpolating a particular distance between the tactile surface and the first object during the third sampling period based on the speed of removal of the first object from the tactile surface and a difference in time from the second sampling period to the third sampling period; and associating the third capacitance value with the particular distance.

20. A method for detecting and characterizing force inputs on a surface, the method comprising:

during a first resistance scan cycle of a first sampling period:

driving a first shield electrode arranged over a resistive touch sensor to a virtual reference potential; and reading a first set of resistance values across sense electrode and drive electrode pairs in the resistive touch sensor;

during a first processing cycle succeeding the first resistance scan cycle of the first sampling period:

transforming the first set of resistance values into a first position and a first magnitude of a force applied to a tactile surface over the shield electrode;

releasing the first shield electrode from the virtual reference potential;

reading a first capacitance value of the first shield electrode; and detecting a second proximity of an object to the tactile surface based on the first capacitance value;

during a second resistance scan cycle of a second sampling period:

driving the first shield electrode to the virtual reference potential; and reading a second set of resistance values across sense electrode and drive electrode pairs in the resistive touch sensor; and during a second processing cycle succeeding the second resistance scan cycle of the second sampling period:

transforming the second set of resistance values into a second position and a second magnitude of the force applied to the tactile surface; and generating a second touch image representing the second position and the second magnitude of the force on the tactile surface for the second sampling period based on the first proximity of the object to the tactile surface.

* * * * *